United States Patent
Takemoto

(10) Patent No.: US 9,141,873 B2
(45) Date of Patent: Sep. 22, 2015

(54) APPARATUS FOR MEASURING THREE-DIMENSIONAL POSITION, METHOD THEREOF, AND PROGRAM

(71) Applicant: CANON KABUSHIKI KAISHA, Tokyo (JP)

(72) Inventor: Kazuki Takemoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 342 days.

(21) Appl. No.: 13/727,334

(22) Filed: Dec. 26, 2012

(65) Prior Publication Data

US 2013/0163883 A1    Jun. 27, 2013

(30) Foreign Application Priority Data

Dec. 27, 2011  (JP) ................................. 2011-286326

(51) Int. Cl.
| | | |
|---|---|---|
| *G06K 9/48* | (2006.01) | |
| *G06K 9/46* | (2006.01) | |
| *G06K 9/00* | (2006.01) | |
| *G06K 9/50* | (2006.01) | |

(52) U.S. Cl.
CPC .......... *G06K 9/4671* (2013.01); *G06K 9/00382* (2013.01); *G06K 9/50* (2013.01)

(58) Field of Classification Search
CPC ... G06T 7/0081; G06T 7/0083; G06T 15/205; G06T 17/00; G06T 2200/08; G06T 2207/10021; G06K 9/00201; G06K 9/48; G06K 9/00375; G06K 9/00382; G06K 9/00624; G06K 9/4604; G06K 9/00214
USPC ................. 382/199, 181, 278, 282, 154, 128
See application file for complete search history.

(56) References Cited

U.S. PATENT DOCUMENTS

| | | | | |
|---|---|---|---|---|
| 6,256,036 | B1 * | 7/2001 | Matsumoto | 345/419 |
| 6,901,170 | B1 * | 5/2005 | Terada et al. | 382/260 |
| 2003/0063084 | A1 * | 4/2003 | Burke | 345/419 |
| 2004/0037460 | A1 * | 2/2004 | Luo et al. | 382/165 |
| 2005/0017969 | A1 * | 1/2005 | Sen et al. | 345/419 |
| 2005/0052452 | A1 * | 3/2005 | Baumberg | 345/419 |
| 2007/0086667 | A1 * | 4/2007 | Dai et al. | 382/242 |
| 2007/0122027 | A1 * | 5/2007 | Kunita et al. | 382/154 |
| 2009/0198464 | A1 * | 8/2009 | Clarke et al. | 702/82 |
| 2010/0312112 | A1 * | 12/2010 | Kamiyama | 600/443 |

(Continued)

FOREIGN PATENT DOCUMENTS

| | | |
|---|---|---|
| JP | 9-97342 A | 4/1997 |
| JP | 2003-141510 A | 5/2003 |

(Continued)

*Primary Examiner* — Stephen R Koziol
*Assistant Examiner* — Shaghayegh Azima
(74) *Attorney, Agent, or Firm* — Canon USA Inc. IP Division

(57) ABSTRACT

An information processing apparatus includes an input unit configured to input a plurality of images captured from a plurality of viewpoints, an extraction unit configured to extract a region of an object from each of the plurality of images, an acquisition unit configured to obtain a contour from the region of the object, a smoothing unit configured to perform smoothing of the contour based on a point group on the obtained contour, a correlation unit configured to correlate regions of the object extracted from respective ones of the plurality of images, and a calculation unit configured to calculate a position of the object based on information of regions correlated by the correlation unit and the point group obtained by the smoothing unit.

13 Claims, 21 Drawing Sheets

(56) References Cited

U.S. PATENT DOCUMENTS

| | | | |
|---|---|---|---|
| 2010/0328682 A1* | 12/2010 | Kotake et al. | 356/620 |
| 2012/0057759 A1* | 3/2012 | Yonaha | 382/107 |
| 2013/0076865 A1* | 3/2013 | Tateno et al. | 348/46 |
| 2013/0124148 A1* | 5/2013 | Jin et al. | 703/1 |
| 2013/0236108 A1* | 9/2013 | Matsuda et al. | 382/203 |

FOREIGN PATENT DOCUMENTS

| | | |
|---|---|---|
| JP | 2003-346162 A | 12/2003 |
| JP | 2005-346469 A | 12/2005 |
| JP | 2009-76060 A | 4/2009 |
| JP | 2011-27724 A | 2/2011 |

\* cited by examiner

FIG.5
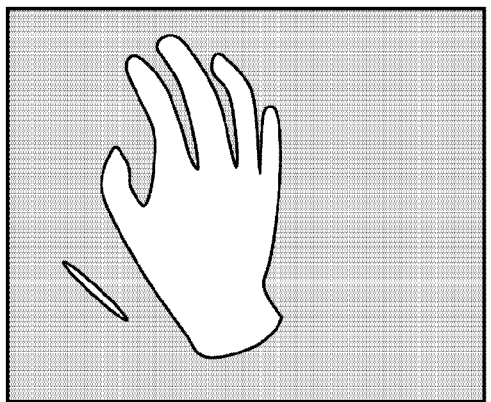
IMAGE CAPTURED BY
IMAGING APPARATUS 100
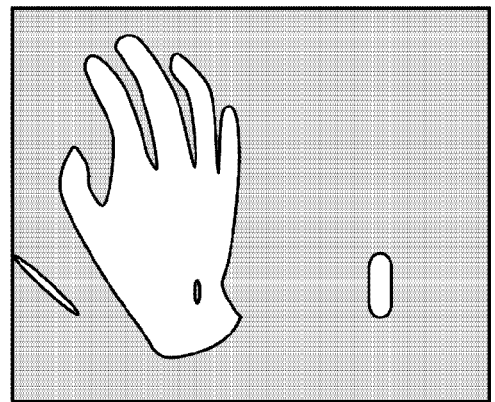
IMAGE CAPTURED BY
IMAGING APPARATUS 110

1701L INTERSECTION
1701R INTERSECTION
1705 CORRESPONDING POINT

1701L INTERSECTION
1701R INTERSECTION
1705 CORRESPONDING POINT

FIG.19A FIG.19B
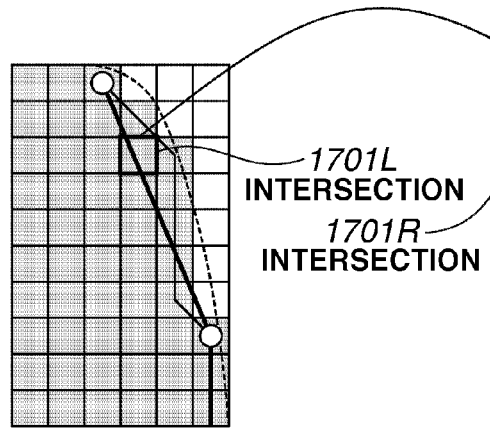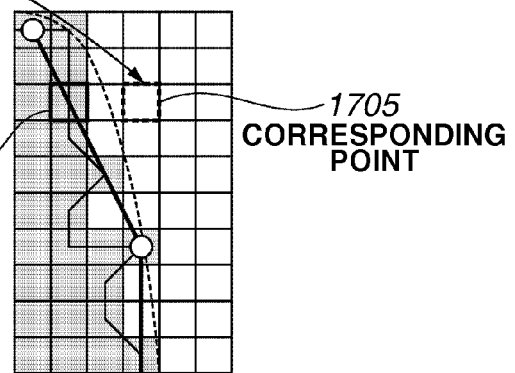
FIG.19C FIG.19D
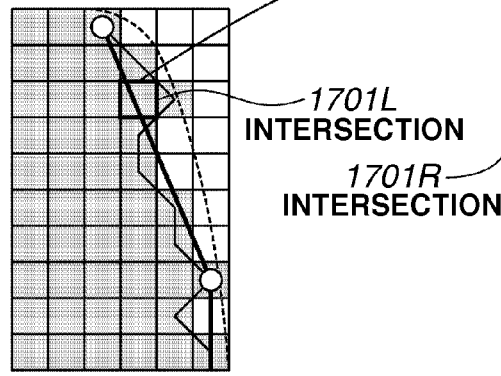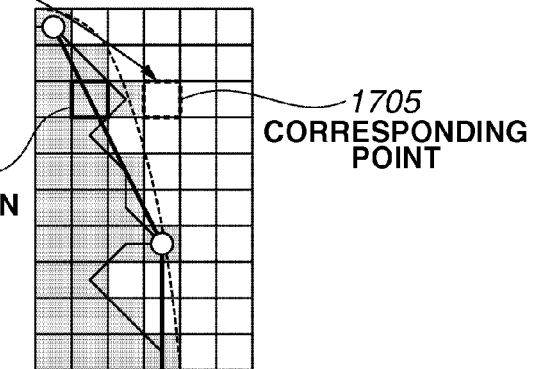

APPARATUS FOR MEASURING THREE-DIMENSIONAL POSITION, METHOD THEREOF, AND PROGRAM

BACKGROUND OF THE INVENTION

1. Field of the Invention

The present invention relates to a technique for measuring a three-dimensional position.

2. Description of the Related Art

Recently, mixed reality (MR) technology has been actively researched. The MR technology seamlessly merges a real space and a virtual space created by a computer. The MR technology is expected to be applied to various fields, such as assembly support in which operation procedures are displayed by superimposing wiring conditions thereon at the time of assembly, and surgery support in which a body surface of a patient is displayed by superimposing internal conditions of the body thereon.

A geometric consistency between a virtual object and the real space is important for making a user to feel that the virtual object exists in the real space. More specifically, the geometric consistency in the mixed reality includes two types of consistency. One is consistency for matching a coordinate system of the real space with the coordinate system of the virtual space, and the other is consistency for correctly expressing an anteroposterior relation between a real object and a virtual object. An issue for dealing with the former consistency is also referred to as a registration problem in the mixed reality, and various researches has been conducted (e.g., refer to Sato, Uchiyama, and Tamura, "A review of registration techniques in mixed reality", Transactions of The Virtual Reality Society of Japan, Vol. 8, No. 2, pp. 171-180, 2003). An issue for dealing with the latter consistency is also referred to as an occlusion problem. In particular, the occlusion problem is also crucial for a video-see through MR system which superimposes a virtual object on an image captured by a camera.

To correctly express the anteroposterior relation between the real object and the virtual object, i.e., hiding (occlusion), it is necessary to obtain three-dimensional position and orientation information of the real object or the virtual object to be hidden. In other words, the three-dimensional position and orientation information of the real object is compared with the three-dimensional position and orientation information of the virtual object, and if the real object is anterior to the virtual object, the captured image is displayed on the anterior side. Further, if the virtual object is anterior to the real object, the virtual object is displayed on the anterior side. In such processing, since there is a known three-dimensional model for the virtual object, the three-dimensional position and orientation of the virtual object with respect to the viewpoint can be calculated. However, the three-dimensional position and orientation of the real object with respect to the viewpoint remains unknown by only capturing the image of the real object, so that it is necessary to obtain the three-dimensional position and orientation of the real object.

A technique for measuring the three-dimensional position and orientation of the real object will be described below. In a general three-dimensional position and orientation measurement technique, matching processing is applied to a focused point in images captured by a stereo camera based on epipolar constraints and pixel patch luminance information. More specifically, if there is a focused point in one image captured by the stereo camera, a point on an epipolar line in the other image captured by the stereo camera is recognized as a corresponding point candidate with respect to the focused point. Pattern matching is then performed between pixel patches around each point remaining as the corresponding point candidate and pixel patches around the focused point. The corresponding points can thus be accurately obtained. (See Japanese Patent Application Laid-Open No. 2011-27724)

Further, Yokoya, Takemura, Okuma, and Kanbara, "Stereo Vision Based Video See-Through Mixed Reality", Proc. International Symposium on Mixed Reality (ISMAR 99), page 131-145, 1999, discusses measuring a three-dimensional position of a real object using two cameras attached to a head mounted display to solve the occlusion problem. In this technique, association is performed only in a region where a virtual object is drawn, so that a calculation amount is reduced.

Furthermore, Kenichi Hayashi, Hirokazu Kato, and Shougo Nishida, "Depth Determination of Real Objects using Contour Based Stereo Matching", Transactions of The Virtual Reality Society of Japan, Vol. 10, No. 3, pp. 371-380, 2005, discusses a following method. A moving object is detected from a difference between a background image referred to as a key frame and a current camera image, and points on the contours of the detected object are matched. Since matching is performed only for the points on the contours, processing can be performed at high speed.

On the other hand, there is a time of flight (TOF) method for measuring a three-dimensional position and orientation in which a real object reflects light emitted from a light source, and a distance to an object is measured from a time of flight (i.e., a delay time) of the light in reaching a sensor and the speed of the light (refer to T. Oggier, B. Buttgen, and F. Lustenberger, "SwissRanger SR3000 and first experiences based on miniaturized 3D-TOF Cameras", Swiss Center for Electronics and Microtechnology, CESM, IEE, Fachhochschule Rapperswil Switzerland, Technical Report, 2005).

However, the technique discussed in "Stereo Vision Based Video See-Through Mixed Reality" can reduce processing by performing stereo matching only in the region where the virtual object is drawn, but it is affected by measuring accuracy. The boundary between the virtual object and the real object thus cannot be correctly displayed, and providing a user with an MR experience with a feeling of strangeness.

Further, the technique discussed in "Depth Determination of Real Objects using Contour Based Stereo Matching" detects the object region using the difference from the key frame, and performs stereo matching of the contours of the object region. As a result, the measurement accuracy at the boundary between the virtual object and the real object is improved, and a user is provided with less feeling of strangeness. However, there is no consideration of noise generated due to a change in background difference regions between frames, and variation of generated depth values is large between the frames. Such a variation may prevent a user from experiencing an immersive feeling.

SUMMARY OF THE INVENTION

The present invention is directed to a three-dimensional position and orientation measuring apparatus capable of stably measuring at high speed a three-dimensional position and orientation of a target object.

According to an aspect of the present invention, an information processing apparatus includes an input unit configured to input a plurality of images captured from a plurality of viewpoints, an extraction unit configured to extract regions of an object from each of the plurality of images, an acquisition unit configured to obtain a contour from the region of the object, a smoothing unit configured to perform smoothing of the contour based on a point group on the obtained contour, a correlation unit configured to correlate regions of the object extracted from respective ones of the plurality of images, and a calculation unit configured to calculate a position of the object based on information of regions correlated by the correlation unit and the point group obtained by the smoothing unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates results of region segmentation performed by the reference point detection unit according to the first exemplary embodiment.

FIGS. 19A, 19B, 19C, and 19D are schematic diagrams illustrating the results of the smoothing processing in which the intersection information is obtained by performing the smoothing processing according to the first exemplary embodiment.

DESCRIPTION OF THE EMBODIMENTS

Various exemplary embodiments, features, and aspects of the invention will be described in detail below with reference to the drawings.

According to a first exemplary embodiment, an information processing apparatus for measuring, based on images captured by two imaging apparatuses of which optical axes are horizontally fixed, a three-dimensional position and orientation of a real object with respect to the imaging apparatuses, will be described below. According to the present exemplary embodiment, a three-dimensional position and orientation of a human hand will be measured as the real object.

Configuration Example

Figure 1:
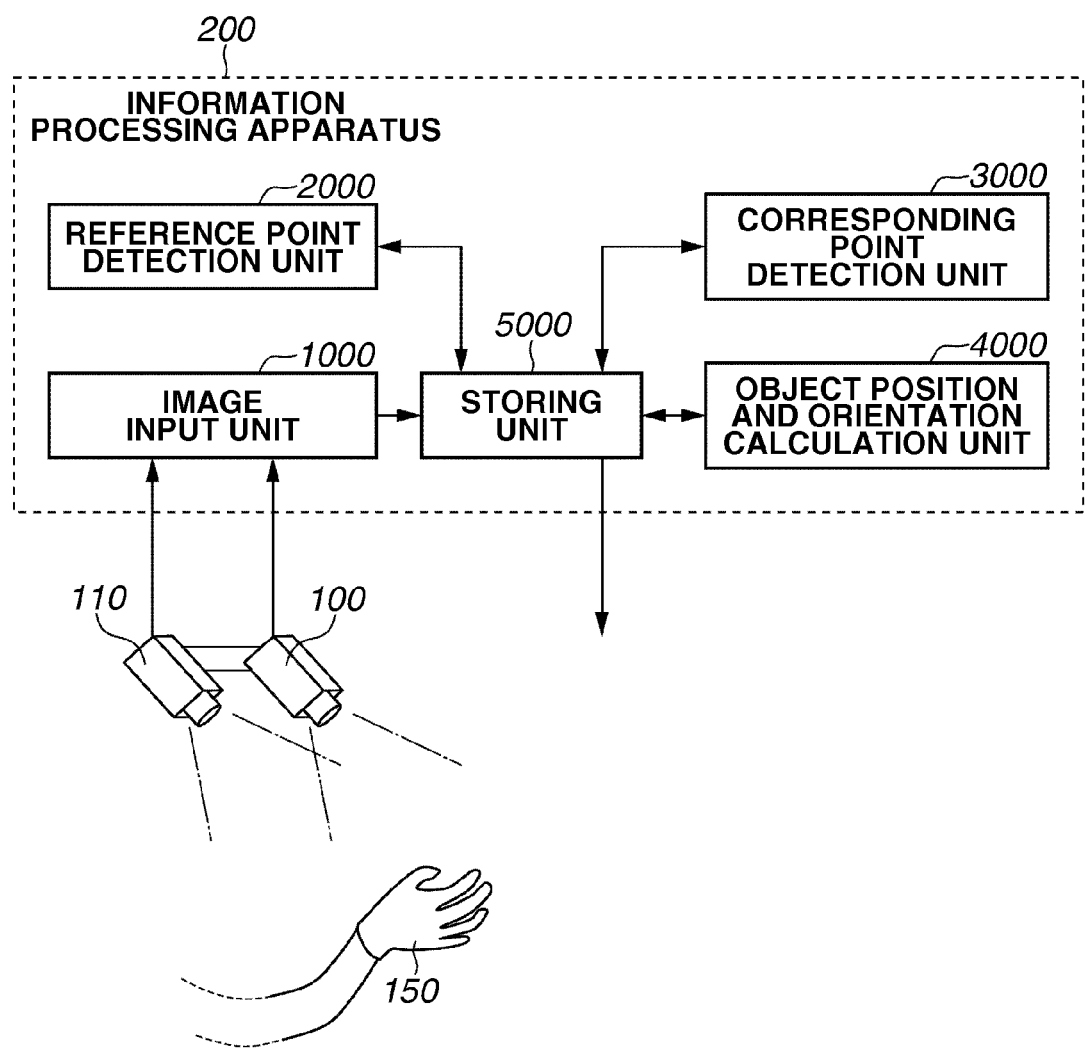
FIG. 1 is a block diagram illustrating a functional configuration of a three-dimensional position and orientation measuring apparatus according to a first exemplary embodiment.

FIG. 1 is a block diagram illustrating a functional configuration of an information processing apparatus 200 for measuring a three-dimensional position and orientation of a real object according to the present exemplary embodiment.

Referring to FIG. 1, the information processing apparatus 200 includes imaging apparatuses 100 and 110, an image input unit 1000, a reference point detection unit 2000, a corresponding point detection unit 3000, an object position and orientation calculation unit 4000, and a storing unit 5000. The information processing apparatus 200 measures a three-dimensional position and orientation of a real object using images captured by the imaging apparatuses 100 and 110, and outputs three-dimensional position and orientation information thereof.

The imaging apparatuses 100 and 110, i.e., video cameras, capture at the same time a scene in which a real object 150 exists from a plurality of different viewpoints. According to the present exemplary embodiment, internal camera parameters of the imaging apparatus 100, such as a focal length and a lens distortion coefficient, are assumed to be obtained and known in advance. Further, external camera parameters for a relative position and orientation between the imaging apparatuses 100 and 110 are assumed to be known. A concrete example of the imaging apparatuses 100 and 110 is two cameras attached to the same chassis such as the head mount display.

The image input unit 1000 inputs images captured by the imaging apparatuses 100 and 110 into a computer. An example of the image input unit 1000 is a video capture card (i.e., an image capturing device 502 illustrated in FIG. 15) installed in a personal computer (PC). Further, according to the present exemplary embodiment, it is assumed that lens distortion correction is performed on obtained images, so that there is no image distortion. Image data input to the computer is output via the image capturing device 502 to the storing unit 5000 on a random access memory (RAM) 505.

Figure 2:
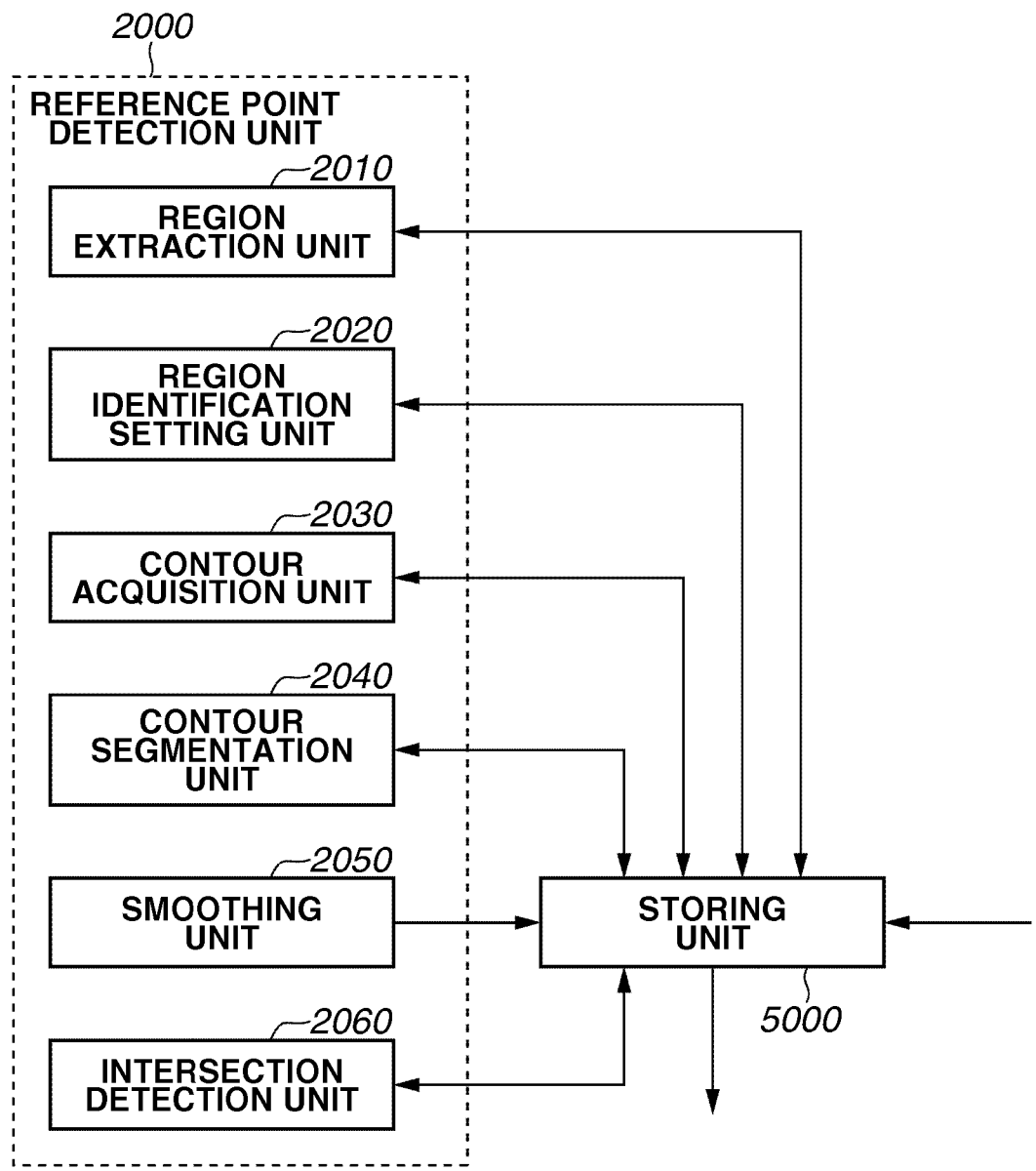
FIG. 2 is a block diagram illustrating a functional configuration of a reference point detection unit according to the first exemplary embodiment.

The reference point detection unit 2000 detects an image coordinate group, i.e., a group of reference points to be used for comparing and determining the correlation between the images captured by the imaging apparatuses 100 and 110. Referring to FIG. 2, the reference point detection unit 2000 includes a region extraction unit 2010, a region identification setting unit 2020, a contour acquisition unit 2030, an intersection detection unit 2060, a contour segmentation unit 2040, and a smoothing unit 2050.

The region extraction unit 2010 inputs the image obtained by the image input unit 1000 from the storing unit 5000, and extracts regions based on color information. According to the present exemplary embodiment, the region extraction unit 2010 sets in advance the color information of the real object 150, and segments the obtained image into the regions included in the color information of the real object 150 and other regions. The region extraction unit 2010 then generates a binary image in which a value of a pixel in the extracted regions is set to 1 and a value of a pixel in the other regions is set to 0. Further, the region extraction unit 2010 calculates the contour of the extracted region from the binary image, and outputs the contour as contour information to the storing unit 5000. In this case, directions are determined, such that if the pixel value of the region surrounded by the contour is 1, the direction becomes clockwise, and if the pixel value of the region surrounded by the contour is 0, the direction becomes anti-clockwise.

According to the present exemplary embodiment, the contour information is stored as an 8-connected image coordinate list. However, the present exemplary embodiment is not limited to storing the contour information as a 8-connected image coordinate list having orientation, and any type of data which can appropriately express the contour and values of the internal region is applicable. For example, a four-connected image coordinate list and a variable having values of the internal region surrounded by the contour may be correlated with each other and stored.

The region identification setting unit 2020 performs labeling of the regions extracted by the region extraction unit 2010. According to the present exemplary embodiment, the region identification setting unit 2020 labels the regions in descending order of the area, and removes as noise the regions having an area which is less than or equal to a threshold value. Upon removing the noise, the region identification setting unit 2020 correlates the contour information of the remaining regions to label information, and outputs to the storing unit 5000.

The contour acquisition unit 2030 obtains the contour of the extraction region.

The contour segmentation unit 2040 obtains the contour information from the storing unit 5000 and segments the contour while retaining outline features of the input target object.

According to the present exemplary embodiment, the contour segmentation unit 2040 recursively performs segmentation. When the contour segmentation unit 2040 completes the initial segmentation, the contour segmentation unit 2040 determines whether the segmented contour is approximated to a straight line segment that connects segmentation points. The contour segmentation unit 2040 further segments the contour which cannot be approximated to the line segment. The contour segmentation unit 2040 then outputs to the storing unit 5000 the resulting image coordinates of the segmentation points on the finally obtained contour. The recursive contour segmentation processing will be described in detail below.

The present exemplary embodiment is not limited to using a recursive segmentation algorithm in segmenting contours, and any contour segmentation algorithm capable of performing smoothing while retaining the outline features is applicable. For example, a method which adds segmentation points in the case where a curvature of the contour is greater than the threshold value may be applied.

The smoothing unit 2050 connects the segmentation points output by the contour segmentation unit 2040 with line segments, and thus generates contour information of a smoothed contour obtained by smoothing the original contour. The smoothing unit 2050 then outputs the smoothed contour information to the storing unit 5000, and replaces the original information output by the contour acquisition unit 2030 with it. Hereinafter, the replaced contour information is the obtained contour information.

Before performing detection, the intersection detection unit 2060 sets in advance scanning lines to each of the images captured by the imaging apparatuses 100 and 110. The scanning lines are regarded as lines that pass through the same positions in the real space in the respective images.

As an example for setting the scanning lines, if relative positions of the imaging apparatuses 100 and 110 are known in advance, the intersection detection unit 2060 can set the scanning lines by assuming the positions in the image the scanning lines pass through. For example, if the imaging apparatuses 100 and 110 are horizontally disposed at the same height on the head mount display, the intersection detection unit 2060 may draw horizontal lines of the same heights in the respective images captured by the imaging apparatuses 100 and 110. Such horizontal lines are a type of the epipolar line to be described below.

For other examples, the intersection detection unit 2060 can set the scanning lines as follows. If the real space captured by the imaging apparatuses 100 and 110 is irradiated with a visual laser in a linear form, an extension of laser lines captured by both the imaging apparatuses 100 and 110 can be used as the scanning lines.

According to the present exemplary embodiment, lines generally referred to as epipolar lines are set as the scanning lines. The epipolar line is briefly described below. If the viewpoints of the imaging apparatuses 100 and 110 are respectively set as points C and C', and a point P is set in a three-dimensional space, these three points C, C', and P can define a plane Σ in the space. Such a plane is referred to as an epipolar plane, and a line which is formed at an intersection between the epipolar plane and an image surface is referred to as the epipolar line.

According to the present exemplary embodiment, an epipolar plane group Ln is calculated from a point group Pn that runs through centers of the images captured by the imaging apparatus 100 and segments by 10 pixels in a vertical direction, the viewpoint C of the imaging apparatus 100, and the viewpoint C' of the imaging apparatus 110. An epipolar line group En (referred to as scanning lines 300 as necessary) in respective projection surfaces of the imaging apparatuses 100 and 110 are then arranged.

As described above, contour matching of the extracted regions between the left and right images can be performed at high speed by presetting the epipolar line group.

Figure 8:
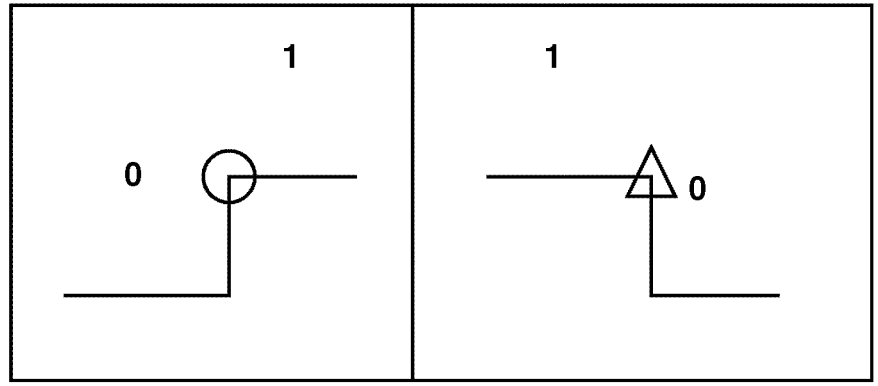
FIG. 8 illustrates a method for obtaining an attribute of an intersection on the scanning line according to the first exemplary embodiment.

The intersection detection unit 2060 then inputs the contour information calculated by the smoothing unit 2050 and the information of the scanning lines 300, and detects the intersections between the smoothed contour and the scanning lines. Further, the intersection detection unit 2060 records attributes in the vicinity of the intersections. The attribute is a feature for determining whether the intersection is on a left side or a right side of the extraction region with respect to a scanning direction of the scanning line. Referring to FIG. 8, the intersection detection unit 2060 searches from the left to the right on the scanning line. If the pixel value of the extraction region changes from 0 to 1 at the intersection, a positive value is set as the attribute, and if the pixel value changes from 1 to 0, a negative value is set as the attribute.

According to the present exemplary embodiment, the intersection detection unit 2060 determines the position of the intersection using the direction of the contour. In other words, if the direction of a subsequent pixel on the contour at the intersection indicates upward, upper right, right, or upper left direction, the intersection detection unit 2060 determines the intersection to be on the left side of the extracted region. In contrast, if the subsequent pixel on the contour at the intersection indicates downward, upper left, left, or upper right direction, the intersection detection unit 2060 determines the intersection to be on the right side of the extracted region.

If the intersection detection unit 2060 determines the intersection to be on the left side of the extracted region, the attribute is set to 1, and if the intersection detection unit 2060 determines the intersection to be on the right side of the extracted region, the attribute is set to −1. The attribute is used by the corresponding point detection unit 3000 in performing correlation. The intersection detection unit 2060 outputs the obtained image coordinates and attributes of the intersection to the storing unit 5000 as intersection information. The storing unit 5000 stores the data of the following information to be managed.

- video images captured by the camera (i.e., video images obtained by the imaging apparatuses 100 and 110)
- contour information (including a connected list of labels and image coordinates as elements)
- segmentation point information of the contour (i.e., a list of image coordinates of the segmentation points generated for smoothing the contour)
- intersection information (including as elements, a list of image coordinates indicating the intersections between the contour and the epipolar lines, and an attribute list for determining whether the intersection is on the left side or the right side of the region)
- corresponding point information (i.e., correspondence information of the intersections in the left and right images output by the processing of the corresponding point detection unit 3000)

The storing unit 5000 outputs to the corresponding point detection unit 3000 the contour information and the intersection information managed therein.

The present exemplary embodiment is not limited to the storing unit 5000 storing the above-described types of data. The storing unit 5000 may store any data as long as the data includes the segmentation point information of the contour that is usable in the processing performed by the object position and orientation calculation unit 4000 and retains the features of the target object.

The corresponding point detection unit 3000 detects, based on the intersection information detected by the reference point detection unit 2000, the corresponding points indicating the correspondence relation between the images captured by the imaging apparatuses 100 and 110.

Figure 3:
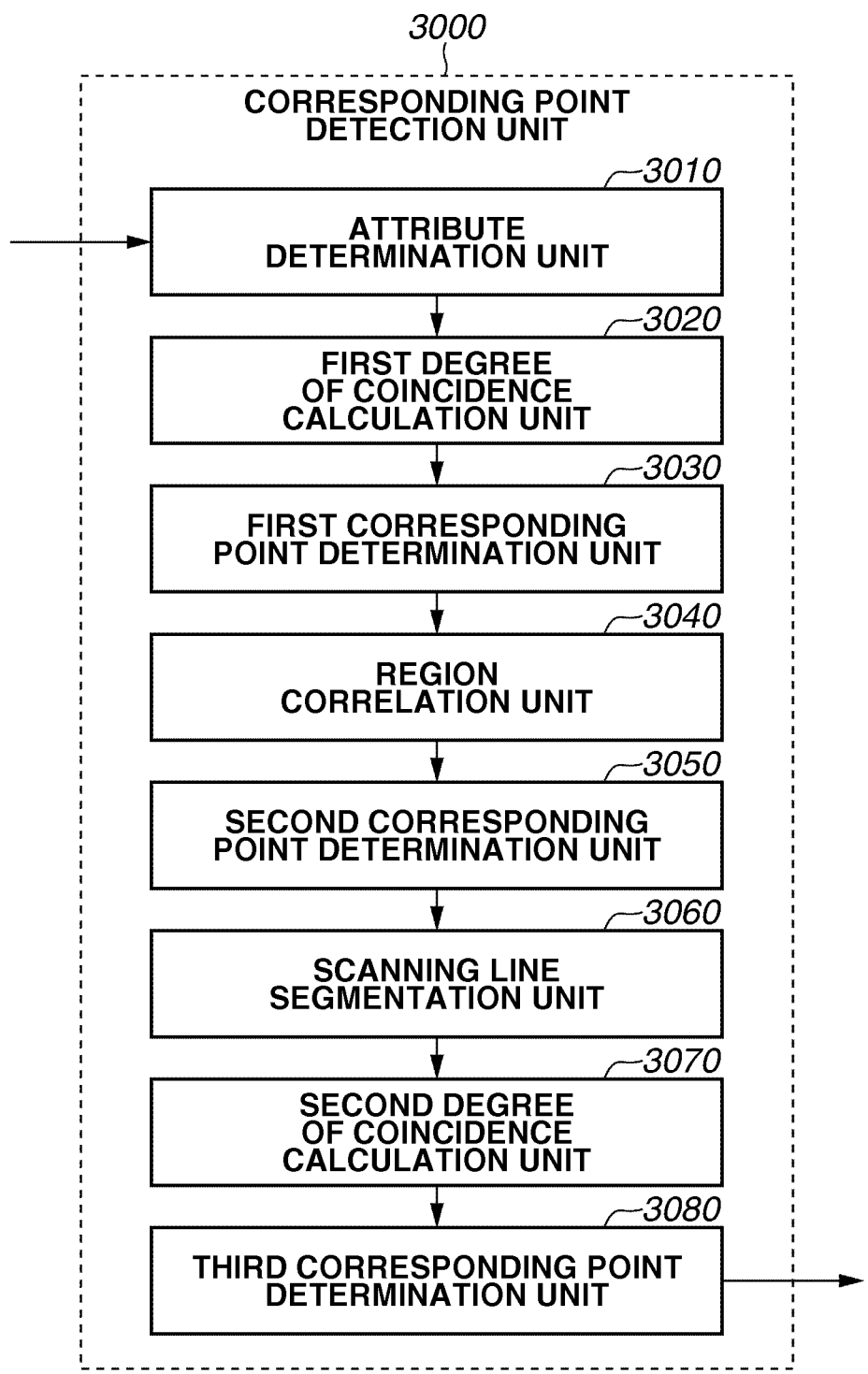
FIG. 3 is a block diagram illustrating a functional configuration of a corresponding point detection unit according to the first exemplary embodiment.

FIG. 3 is a block diagram illustrating the configuration of the corresponding point detection unit 3000. Referring to FIG. 3, the corresponding point detection unit 3000 includes an attribute determination unit 3010, a first degree of coincidence calculation unit 3020, a first corresponding point determination unit 3030, a region correlation unit 3040, a second corresponding point determination unit 3050, a scanning line segmentation unit 3060, a second degree of coincidence calculation unit 3070, and a third corresponding point determination unit 3080.

The attribute determination unit 3010 is input the intersection information and the contour information from the storing unit 5000, and generates a list of the attributes of the intersections on the scanning lines 300. More specifically, the attribute determination unit 3010 lists for each scanning line, the attributes obtained by determining whether the intersections on the scanning line are on the left side or the right side of the extracted region with respect to the scanning direction of the scanning line.

The first degree of coincidence calculation unit 3020 compares the intersection attribute list of the image captured by the first imaging apparatus 100 and the intersection attribute list of the image captured by the second imaging apparatus 110, and calculates a degree of coincidence P. The first degree of coincidence calculation unit 3030 then outputs to the first corresponding point determination unit 3030 the calculated degree of coincidence P.

The first corresponding point determination unit 3030 is input the degree of coincidence P of the intersection attribute lists from the first degree of coincidence calculation unit 3020. The first corresponding point determination unit 3030 then determines the corresponding points which have the correspondence relation between the images, based on the degree of coincidence of the intersection attribute lists. The first corresponding point determination unit 3030 outputs to the region correlation unit 3040 pairs of image coordinates of the corresponding points as the corresponding point information.

The region correlation unit 3040 is input the corresponding point information from the first corresponding point determination unit 3030. The region correlation unit 3040 correlates the smoothed contour in which the corresponding points exist to the label of the extracted region of which the contour is the boundary line. The region correlation unit 3040 then outputs to the second corresponding point determination unit 3050 the label of the extracted region as the correspondence information of the smoothed contour.

The second corresponding point determination unit 3050 similarly determines as the corresponding points, other intersections through which the contour passing through the corresponding points determined by the first corresponding point determination unit 3030 passing, based on the correlation to the extracted region determined by the region correlation unit 3040. The second corresponding point determination unit 3050 thus outputs to the scanning line segmentation unit 3060 the new corresponding point information.

The scanning line segmentation unit 3060 is input the corresponding point information from the second corresponding point determination unit 3050, and segments the intersection attribute list based on the corresponding points.

More specifically, the scanning line segmentation unit 3060 generates segmented scanning lines by segmenting the scanning lines at the positions of the corresponding points. The attributes other than those at the positions of the corresponding points in the intersection attribute list thus becomes an attribute of one of the segmented scanning lines. The scanning line segmentation unit 3060 outputs to a second degree of coincidence calculation unit 3070 the segmented intersection attribute list.

The second degree of coincidence calculation unit 3070 compares the segmented intersection attribute list of the image captured by the first imaging apparatus 100 with the segmented intersection attribute list of the image captured by the second imaging apparatus 110, and calculates a degree of coincidence Q. The second degree of coincidence calculation unit 3070 then outputs to the third corresponding point determination unit 3080 the calculated degree of coincidence Q.

The third corresponding point determination unit 3080 is input from the scanning line segmentation unit 3060 the segmented intersection attribute lists. The third corresponding point determination unit 3080 then determines the corresponding points based on the degree of coincidence Q of the segmented intersection attribute lists, and outputs the corresponding point information to the storing unit 5000.

The object position and orientation calculation unit 4000 calculates the three-dimensional arrangement of the target object based on the intersection information and the corresponding point information. The three-dimensional arrangement indicates the three-dimensional position, orientation, or position and orientation.

Figure 16:
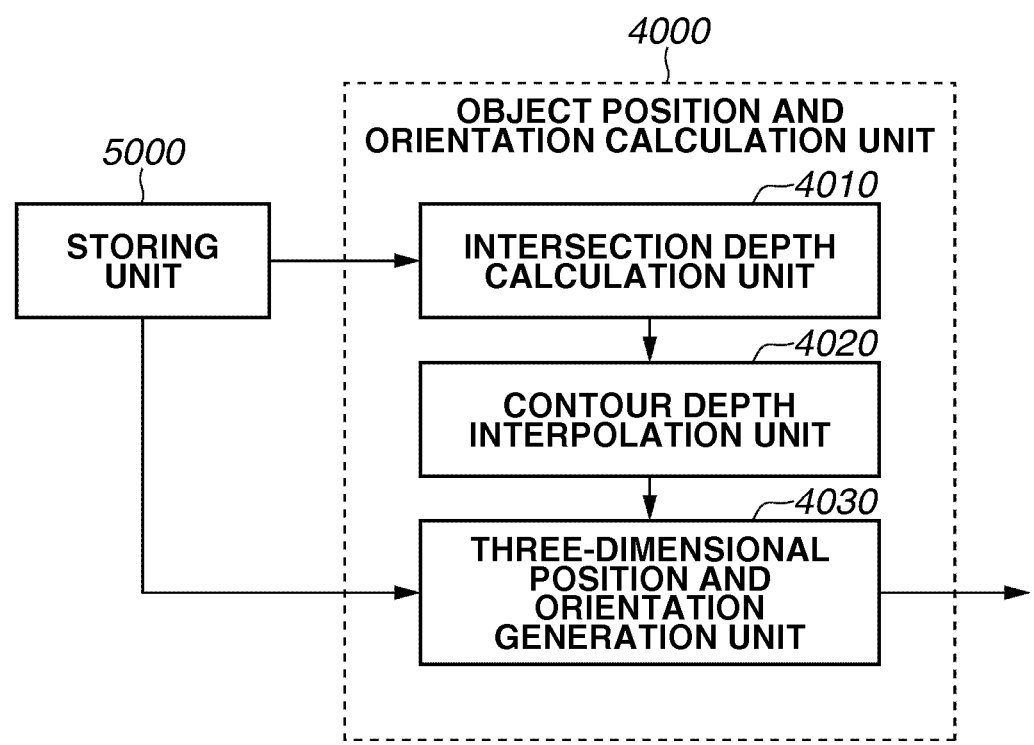
FIG. 16 is a block diagram illustrating the functional configuration of the object position and orientation calculation unit according to the first exemplary embodiment.

FIG. 16 is a block diagram illustrating the object position and orientation calculation unit 4000. Referring to FIG. 16, the object position and orientation calculation unit 4000 includes an intersection depth calculation unit 4010, a contour depth interpolation unit 4020, and a three-dimensional position and orientation generation unit 4030.

The intersection depth calculation unit 4010 is input from the storing unit 5000 the intersection information and the corresponding point information, and calculates, with respect to the imaging apparatus, depth values of the intersections correlated between the two images. The intersection depth calculation unit 4010 then correlates the calculated depth values of the intersections to the intersection information of the respective images captured by the imaging apparatuses 100 and 110. The intersection depth calculation unit 4010 outputs to the contour depth interpolation unit 4020 the detected corresponding point information and the depth values.

The contour depth interpolation unit 4020 sets the depth values to all pixels of the contour by performing linear interpolation based on the calculated depth values of a plurality of intersections on the contour. The contour depth interpolation unit 4020 then outputs to the three-dimensional position and orientation generation unit 4030 the contour information correlated to the depths values.

The three-dimensional position and orientation generation unit 4030 is input from the storing unit 5000 the contour segmentation information. The three-dimensional position and orientation generation unit 4030 then generates the three-dimensional position and orientation information of the target object from the image coordinates of the segmentation points and the depths values of the contour at the segmentation points.

Conventionally, it is necessary for the three-dimensional position and orientation generation unit 4030 to calculate vertex information in which the features of the shape of the target object are remained. However, by diverting the segmentation points previously generated for the smoothing processing by the contour segmentation unit 2040, time for calculating the vertex information can be omitted.

<Reference Point Detection Flow>

Figure 4:
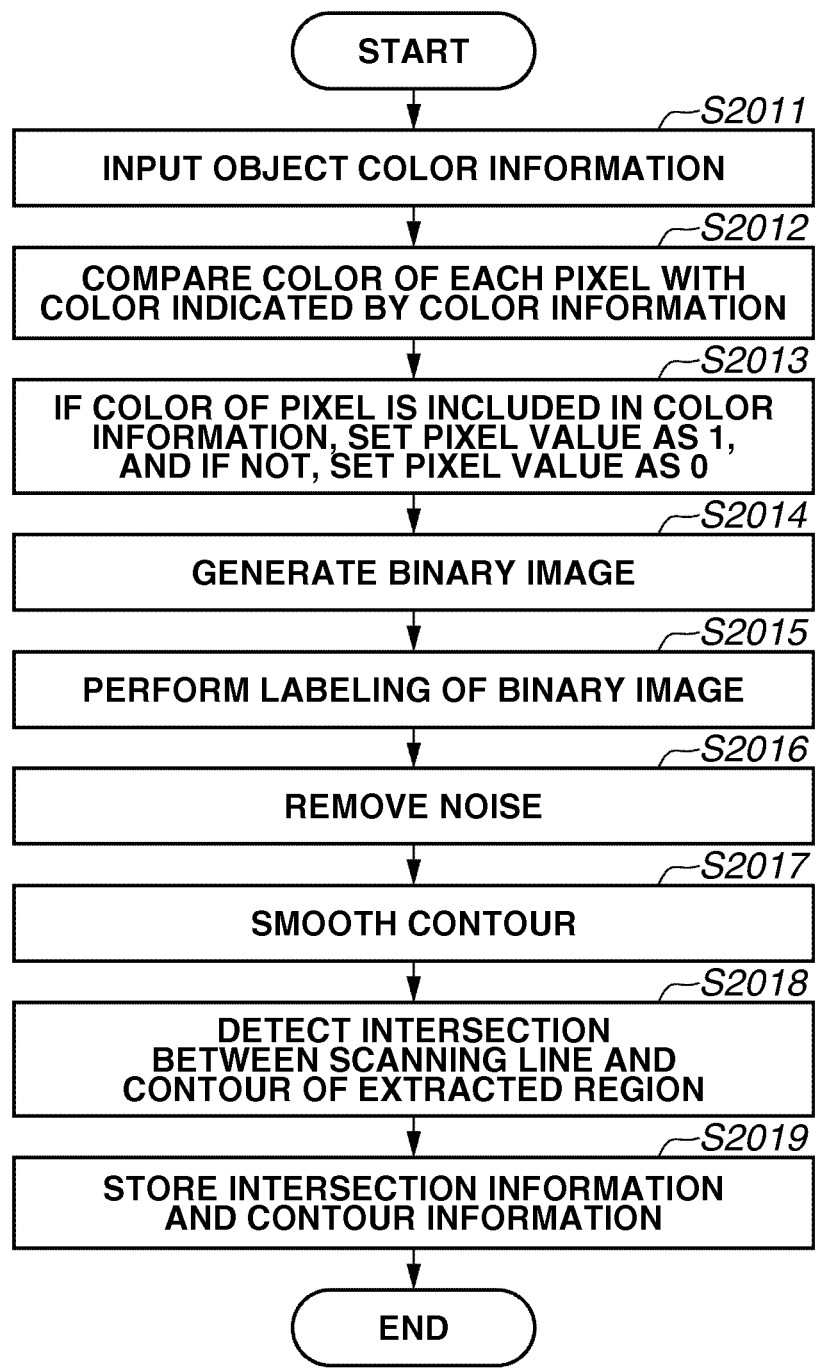
FIG. 4 is a flowchart illustrating processing performed by the reference point detection unit according to the first exemplary embodiment.

The processing performed by the reference point detection unit 2000 will be described in detail below. FIG. 4 is a flowchart illustrating the processing performed by the reference point detection unit 2000.

In step S2011, the reference point detection unit 2000 inputs object color information of the object which is registered in advance.

In step S2012, the reference point detection unit 2000 compares the color of each pixel in the images captured by the respective imaging apparatuses 100 and 110 with the color indicated by the object color information.

In step S2013, as a result of comparison of the color information of each pixel in the images and the object color information, if the color information of the pixel is included in the input object color information, the reference point detection unit 2000 sets the pixel value to 1, and if not, the reference point detection unit 2000 sets the pixel value to 0.

In step S2014, the reference point detection unit 2000 generates binary images based on the comparison results of the color information. More specifically, if the color information of the pixel is included in the input object color information, the reference point detection unit 2000 sets the color of the region to white, and sets the color of other regions to black.

In step S2015, the reference point detection unit 2000 performs labeling of the binary images.

In step S2016, the reference point detection unit 2000 removes as noise from the labeled binary images, the regions of which area is smaller than a set threshold value. In other words, the reference point detection unit 2000 reverses 0 and 1 (white and black) in the region determined as noise.

According to the above-described method, the regions are extracted using the color information for detecting the object regions. As a result, if there are shaded portions or regions of similar colors, the reference point detection unit 2000 cannot completely remove false detection or the noise in step S2016. FIG. 5 illustrates the binary images as a result of the region extraction containing noise.

The color information to be used in region extraction may be described as coordinate values in a multi-dimensional color space. There are various color information spaces such as RGB, YIQ, YCbCr, YUV, HSV, Luv, and Lab. An appropriate color space may be arbitrarily used according to color characteristics of the target object. Further, the method for segmenting the regions is not limited to the above-described example, and any method using the color information may be performed.

In step S2017, the contour segmentation unit 2040 and the smoothing unit 2050 perform smoothing of the contour of the extracted regions. The smoothing processing will be described in detail below.

In step S2018, the intersection detection unit 2060 detects the intersections between the smoothed contours and the scanning lines, and obtains the image coordinates.

Figure 6:
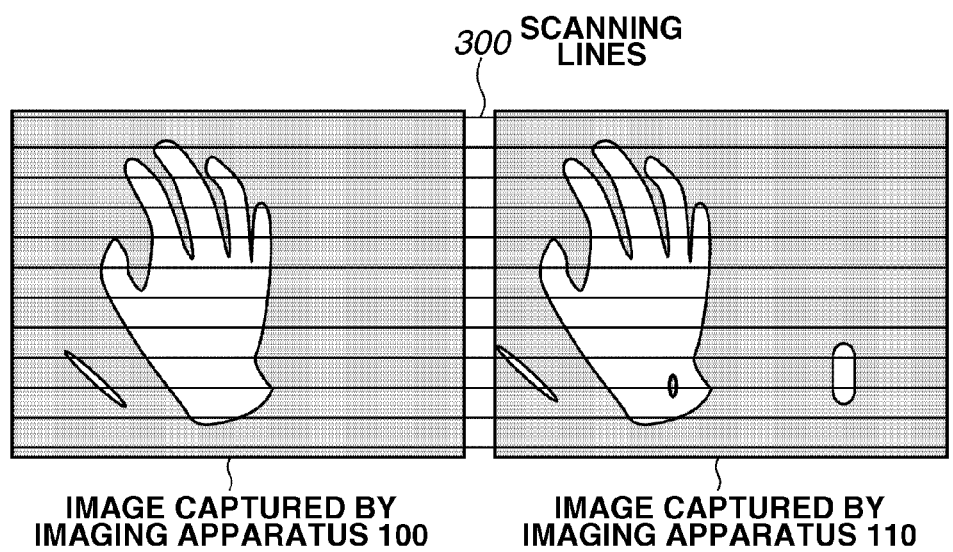
FIG. 6 illustrates scanning lines superimposed and displayed on binary images of extracted regions according to the first exemplary embodiment.

FIG. 6 illustrates the scanning lines superimposed and displayed on the binary images of the extracted regions. According to the present exemplary embodiment, the epipolar lines En are used as the scanning lines. Thus, the image coordinates of the target object detected by the imaging apparatus 100 are detected on the scanning lines of the image captured by the imaging apparatus 110. On the other hand, the image coordinates of the target object detected by the imaging apparatus 110 are detected on the scanning lines of the image captured by the imaging apparatus 100.

The storing unit 5000 stores the points at which the scanning lines 300 and the smoothed contours intersect as the intersection information. The corresponding point detection unit 3000 uses the stored intersection information to correlate the intersections in the image captured by the imaging apparatus 100 and the image captured by the imaging apparatus 110.

Further, the intersection detection unit 2060 refers to the direction of the subsequent pixel on the contour at the image coordinate of the intersection, and determines whether the intersection is on the right side or the left side (i.e., at a starting point side or an end point side of the scanning line) of the extraction region. The intersection detection unit 2060 then stores the determination result as an attribute. The attribute is recorded as an element of the intersection information, correlated with the intersection coordinate.

In step S2019, the storing unit 5000 outputs to the corresponding point detection unit 3000 the intersection information and the contour information of the extracted regions.

<Detail Description of Contour Segmentation Flow>

Figure 13:
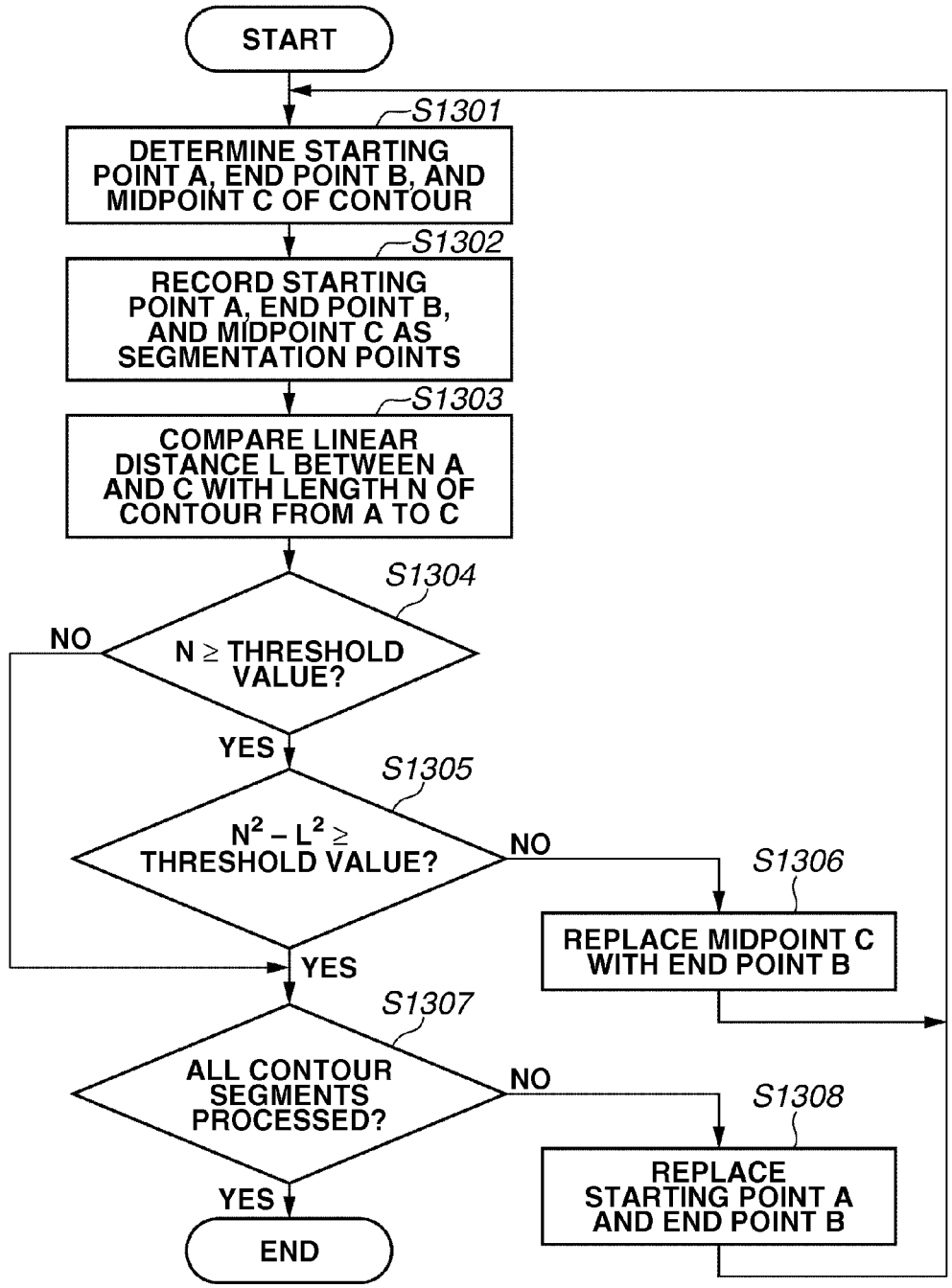
FIG. 13 is a flowchart illustrating smoothing processing according to the first exemplary embodiment.

The smoothing processing by segmenting the contour performed in step S2017 will be described in detail below with reference to a flowchart illustrated in FIG. 13 and schematic diagrams in FIGS. 20, 21A, 21B, 21C, and 21D.

In step S1301, the contour segmentation unit 2040 sets endpoints. More specifically, the contour segmentation unit 2040 refers to the connected image coordinate list of the pixel group on the contour, and sets two endpoints, i.e., a starting point 1801A (a first point) and an end point 1801B (a second point) in the list. Further, the contour segmentation unit 2040 sets a midpoint. That is, the contour segmentation unit 2040 determines a midpoint C 1802 (a third point) which is located at the middle of the two endpoints 1801A and 1801B (refer to FIG. 20). For example, if the connected list of the contour is configured by 200 pixels, the contour segmentation unit 2040 sets the image coordinate of the 100th pixel as the midpoint C 1802.

In step S1302, the contour segmentation unit 2040 records the image coordinates of the starting point 1801A, the endpoint 1801B, and the midpoint C 1802 in the storing unit 5000 as the segmentation point information of the contour. If there are overlapping segmentation points, the contour segmentation unit 2040 does not record the image coordinates.

In step S1303, the contour segmentation unit 2040 calculates a linear distance L 1803 between the starting point 1801A and the midpoint C 1802. Further, the contour segmentation unit 2040 calculates a length N of a contour 1804 passing through the starting point 1801A and the midpoint C 1802 (e.g., left-half of the original contour) in the image coordinate system. The length N corresponding to the pixels in the image coordinate system is calculated by setting a distance between vertically or horizontally adjacent pixels as 1, and a length in which the pixels are arranged in a diagonal direction in the 8-connected list as $\sqrt{2}$. However, the present exemplary embodiment is not limited the above-described contour segmentation method, and any calculation method capable of performing smoothing while retaining the characteristic shape of the contour may be used.

In step S1304, the contour segmentation unit 2040 determines whether the length N of the contour calculated in step S1303 is greater than or equal to a predetermined value. According to the present exemplary embodiment, the predetermined value is set to 4 pixels. If the length N of the contour is greater than or equal to 4 pixels (YES in step S1304), the processing proceeds to step S1305. If the length N of the contour is less than 4 pixels (NO in step S1304), the processing proceeds to step S1307. When the length N is less than 4 pixels, the effect of smoothing cannot be expected even when a line segment group is generated by further segmenting the contour, so that the contour segmentation unit 2040 ends segmentation and proceeds to processing of the subsequent contour.

In step S1305, the contour segmentation unit 2040 calculates a difference between the square of the length N and the square of the linear distance L, and determines whether the result is greater than or equal to a predetermined value. According to the present exemplary embodiment, the predetermined value is set to 50. The present exemplary embodiment is not limited to using an equation employing the length N and the linear distance L in determining a linear line, and any calculation method capable of performing smoothing while retaining the characteristic shape of the contour is applicable.

If the calculated difference exceeds the predetermined value (YES in step S1305), the contour segmentation unit 2040 determines that the contour is not yet approximated to a linear line, and the processing proceeds to step S1306. For example, referring to FIG. 20, the contour segmentation unit 2040 calculates the linear distance L between the starting point 1801A and the midpoint C 1802, and the length N of the segment 1804 of the contour. In the present example, since the calculated difference exceeds the predetermined value, the processing proceeds to step S1307.

More specifically, since the midpoint C which is the segmentation point is replaced by the endpoint 1801B without changing the starting point A, the contour segmentation unit 2040 segments the contour until the segment starting from the starting point A can be approximated to a linear line. If the contour segmentation unit 2040 recursively segments the contour until the difference becomes less than the predetermined value (NO in step S1305), the processing proceeds to step S1306 to process the subsequent segment of the contour.

In step S1306, the contour segmentation unit 2040 replaces the midpoint C 1802 to the endpoint 1801B. The processing then returns to step S1301. In other words, the contour segmentation unit 2040 recursively performs the processing by changing the point to be processed. In the subsequent processing, a midpoint 1821 illustrated in FIG. 21A becomes the segmentation point.

In step S1307, the contour segmentation unit 2040 determines that the currently set contour between the starting point 1801A and the end point 1801B has been approximated to a linear line. The contour segmentation unit 2040 thus records in the storing unit 5000 the image coordinates of the starting point 1801A and the end point 1801B as the segmentation point information of the contour. Further, the contour segmentation unit 2040 refers to the storing unit 5000 and determines whether there is a segment of the current contour which has not been processed. If all of the segments has been processed and the segmentation points are recorded in the segmentation point information of the contour (YES in step S1307), the processing ends. If there is any segment of the contour which has not been approximated to a linear line (NO in step S1307), the processing proceeds to step S1308.

In step S1308, the contour segmentation unit 2040 selects a segment of the contour other than the currently selected segment and which has not been processed, and replaces the current starting point A and end point B with the starting point and the end point of the selected segment of the contour.

In step S1306, the contour segmentation unit 2040 recursively performs the segmentation processing without changing the starting point. On the other hand, in step S1308, the contour segmentation unit 2040 changes the starting point and the end point to those of the segment which has not been processed, and thus performs the segmentation processing on all of the segments of the contour.

As described above, the contour segmentation unit 2040 generates the line segment group which connects the points adjacent to each other on the contour in the set point group, and thus generates the smoothed contour. In other words, the contour segmentation unit 2040 repeats the segmentation until a distance between two points on the contour becomes less than the predetermined value, and replaces the contour by straight line segments whose lengths are less than the predetermined value.

Figure 14:
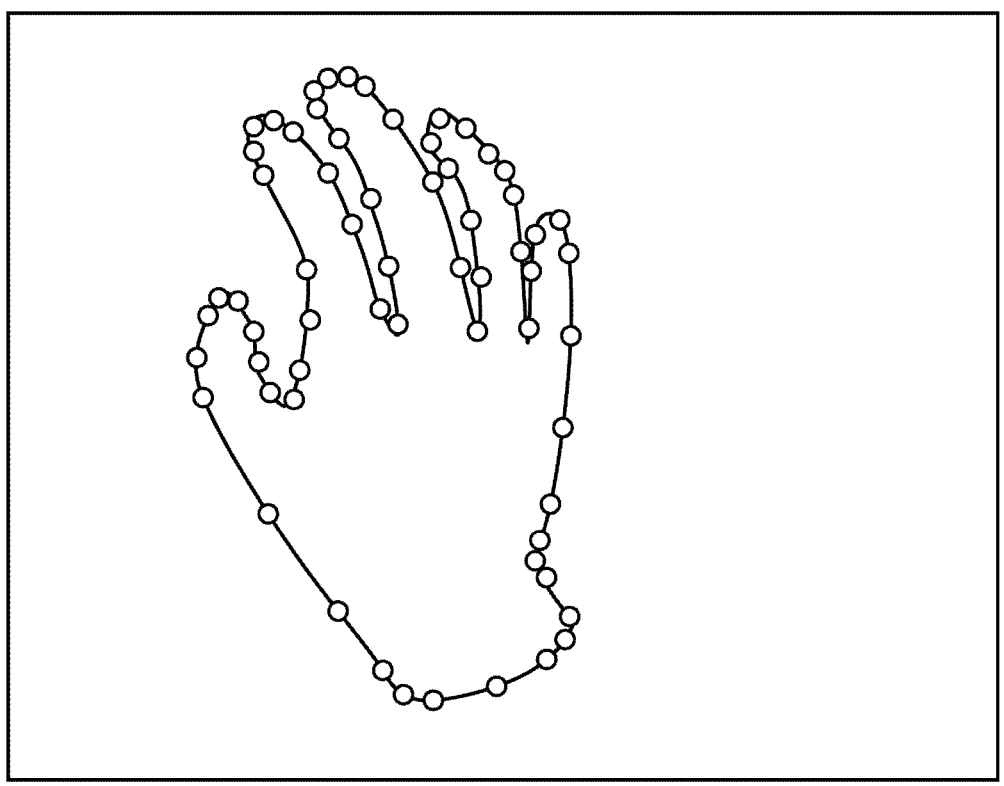
FIG. 14 is a schematic diagram illustrating segmentation points obtained as a result of performing the smoothing processing according to the first exemplary embodiment.
Figure 20:
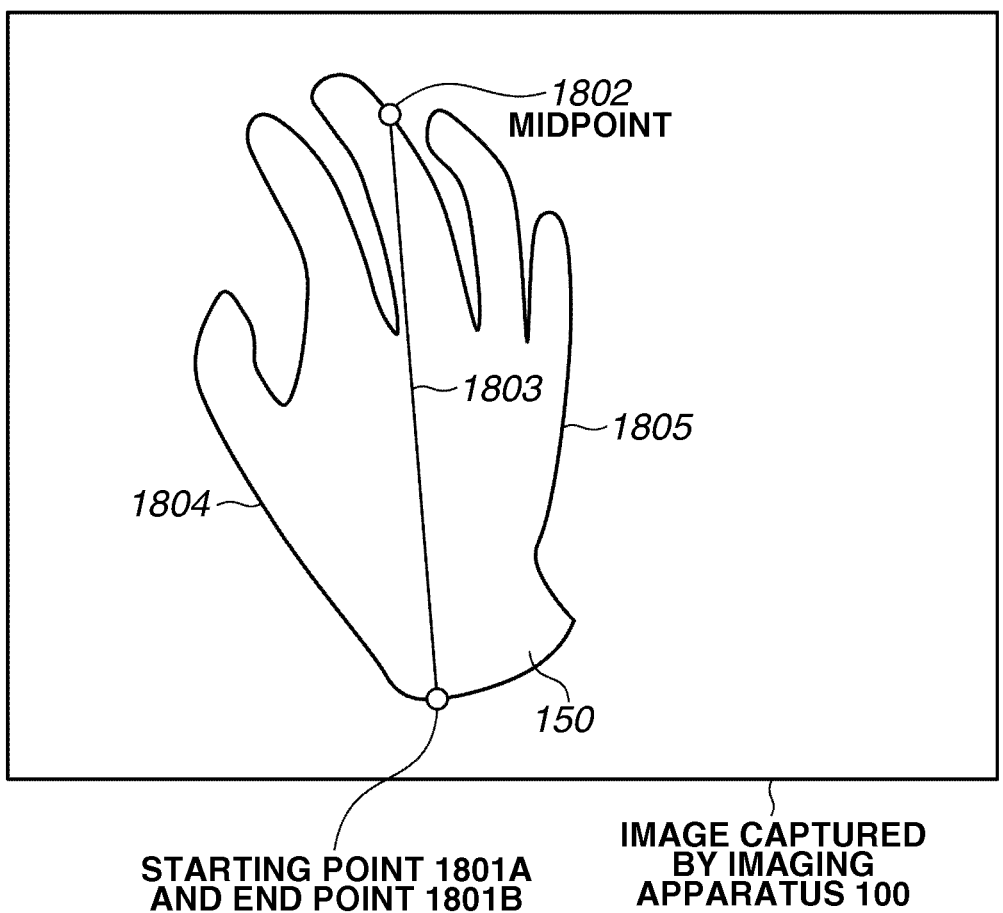
FIG. 20 is a schematic diagram illustrating processing performed by a contour segmentation unit according to the first exemplary embodiment.
Figure 21A:
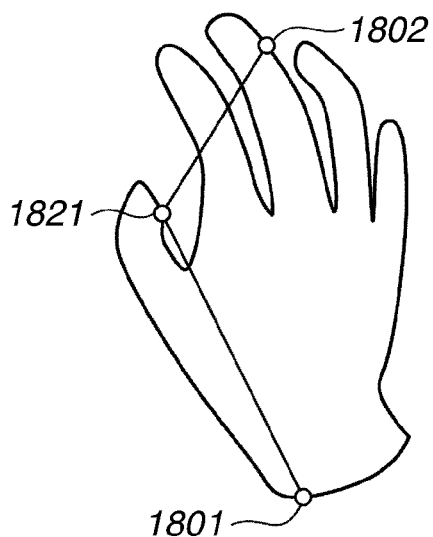
FIGS. 21A, 21B, 21C, and 21D are schematic diagrams illustrating changes in the segmentation points by recursively performing segmentation processing according to the first exemplary embodiment.
Figure 21B:
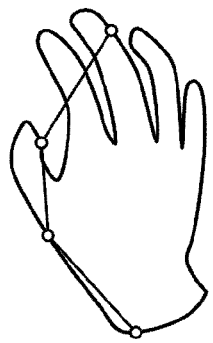
Figure 21C:
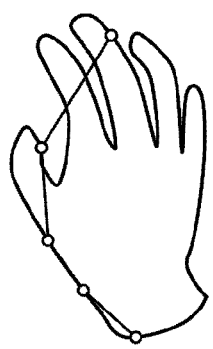
Figure 21D:
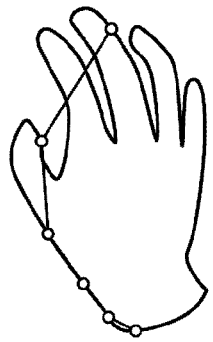

According to the present exemplary embodiment, a case when the imaging apparatus 100 outputs the image as illustrated in FIG. 20 is described. FIGS. 21A, 21B, 21C, and 21D are schematic diagrams illustrating the arrangements of the segmentation points when the contour segmentation unit 2040 segments the contour until the difference calculated in step S1305 does not exceed the predetermined value. Referring to FIGS. 20, and 21A to 21D, the contour starting from the starting point 1801A is recursively obtained. If the smoothing processing is performed as described above, the result as illustrated in FIG. 14 is obtained.

<Noise Reduction>

Figure 17A:
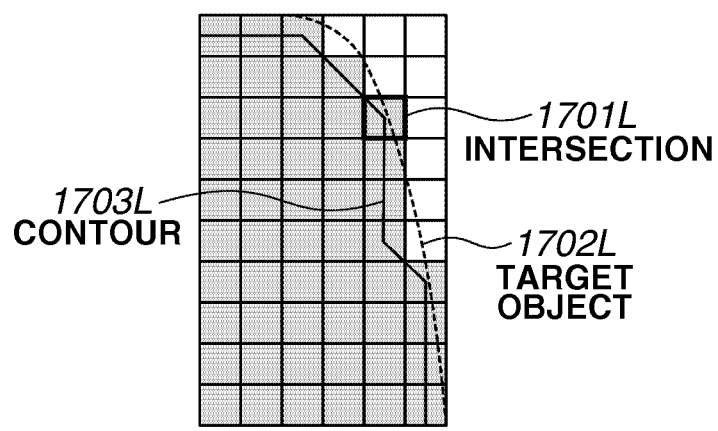
FIGS. 17A and 17B are schematic diagrams illustrating results of the smoothing processing in which intersection information is obtained in an ideal state unaffected by noise according to the first exemplary embodiment.
Figure 17B:
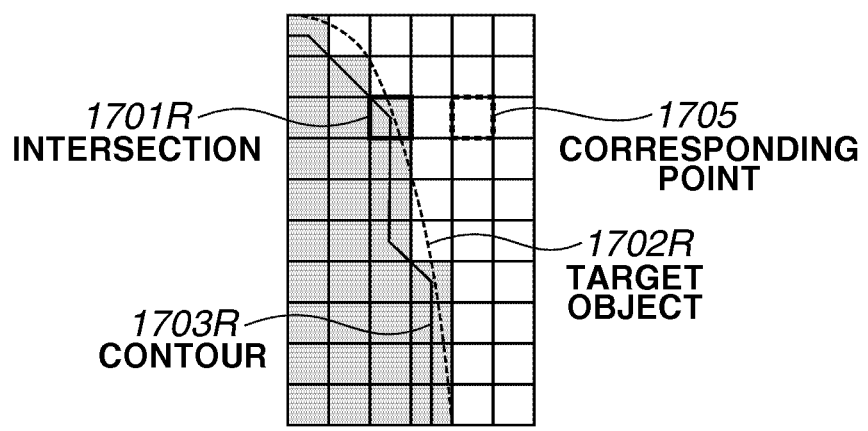

Effects of reduction of noise, such as camera noise and lighting noise, provided by the above-described processing will be described below. FIGS. 17A and 17B illustrate the vicinities of the contours of the target object in the images captured by the imaging apparatuses 100 and 110 in a noise-less state. FIGS. 18A, 18B, 18C, and 18D are schematic diagrams illustrating phenomena in which the distances between the intersecting points and the corresponding points change due to the camera noise, the lighting noise, or the like. FIGS. 19A, 19B, 19C, and 19D are schematic diagrams illustrating the result of the smoothing processing in reducing the effect of noise.

More specifically, FIG. 17A illustrates the image captured by the imaging apparatus 100 disposed on the left side, and FIG. 17B illustrates the image captured by the imaging apparatus 110 disposed on the right side. A line 1702L illustrated in FIG. 17A and a line 1702R illustrated in FIG. 17B indicate ideal contours of the target object 150. Shaded regions illustrated in FIGS. 17A and 17B indicate the regions extracted by the region extraction unit 2013 in step S2013 of the flowchart illustrated in FIG. 4. In other words, the shaded pixel indicates 1, and the shade-less pixel indicates 0. In addition, contours 1703L and 1703R illustrated in FIGS. 17A and 17B indicate the results of obtaining the contours by performing labeling in step S2015.

In such states, intersections 1701L and 1701R indicated by bold frames illustrated in FIGS. 17A and 17B respectively are the intersections of the scanning lines and the extracted regions (i.e., contours) obtained in step S2108. Further, a corresponding point 1705 illustrated in FIG. 17B is the point at which the intersection 1701L illustrated in FIG. 17A is projected at the same position on the image of FIG. 17B. In other words, the distance between the intersection 1701R and the corresponding point 1705 (i.e., the intersection 1701L) is 2 pixels in the ideal noiseless state. If the target object and the imaging unit are stationary, the distance does not ideally change from 2 pixels.

However, the distance actually changes due to the camera noise, the lighting noise, and the like. More specifically, as illustrated in FIG. 18B, the region cannot be normally detected with respect to the ideal contour of the target object, so that the shape of the contour is greatly different from the ideal shape. In such a case, the intersection between the contour of the extracted region and the scanning lines is displaced from the ideal state. As a result, the distance between the intersection 1701R and the corresponding point 1705 (i.e., the intersection 1701L) becomes 3 pixels. In other words, since the distance changes, there is an error with respect to the ideal depth value.

Figure 18A:
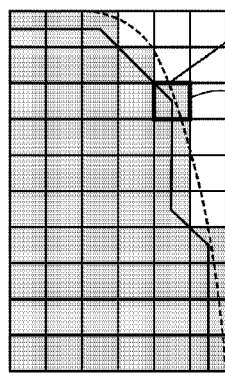
FIGS. 18A, 18B, 18C, and 18D are schematic diagrams illustrating the results of the smoothing processing in which the intersection information is obtained without performing the smoothing processing according to the first exemplary embodiment.
Figure 18B:
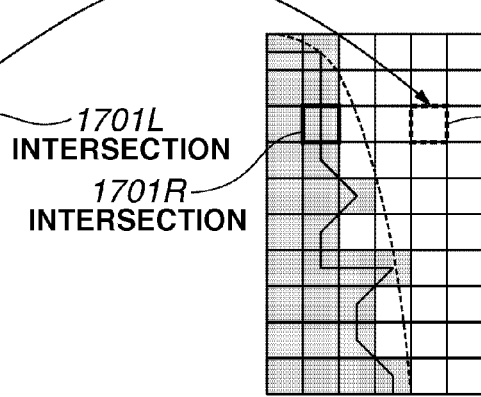
Figure 18C:
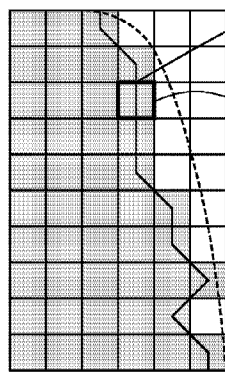
Figure 18D:
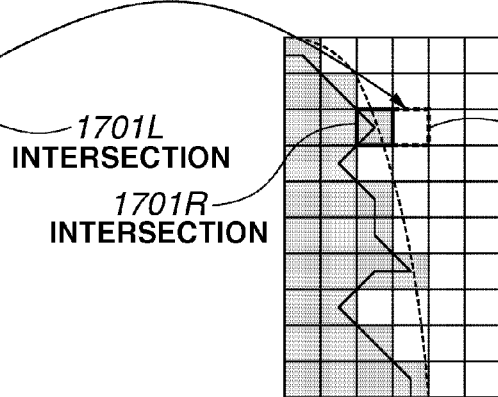

FIGS. 18C and 18D illustrate processing results of the subsequent frames of those illustrated in FIGS. 18A and 18B. Referring to FIGS. 18C and 18D, the regions are not correctly extracted in the subsequent frame due to the noise, and the shapes are also different from the previous frames. Referring to FIG. 18D, the distance between the intersection 1701R and the corresponding point 1705 is 1 pixel. Since the distances are greatly different between the two frames illustrated in FIGS. 18A and 18B and in FIGS. 18C and 18D, the depth values also become unstable.

In contrast, FIGS. 19A, 19B, 19C, and 19D illustrate the results of applying the smoothing processing on the processing results illustrated in FIGS. 18A, 18B, 18C, and 18D. Referring to FIGS. 19A to 19D, the calculated contours are similarly different from the ideal contour of the target object due to the noise. However, the distances between the intersection 1701R and the corresponding point 1705 illustrated in FIGS. 19A and 19B, and in FIGS. 19C and 19D, are 2 pixels in both frames, so that there is a stabling effect.

<Correlation Process Flow>

Figure 7:
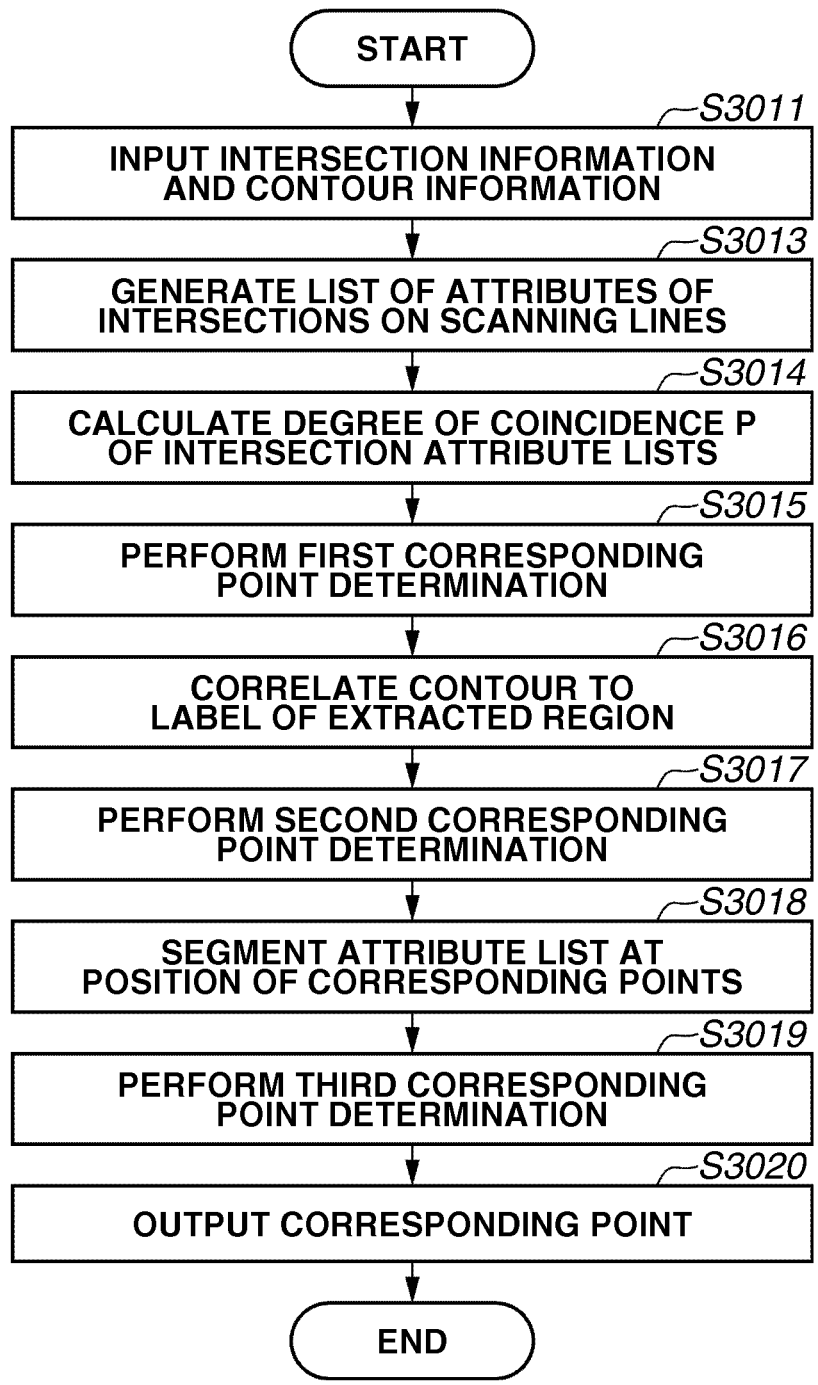
FIG. 7 is a flowchart illustrating processing performed by the corresponding point detection unit according to the first exemplary embodiment.

The processing performed by the corresponding point detection unit 3000 will be described in detail below. FIG. 7 is a flowchart illustrating the processing performed by the corresponding point detection unit 3000.

In step S3011, the attribute determination unit 3010 is input from the intersection information and the contour information the storing unit 5000.

Figure 9:
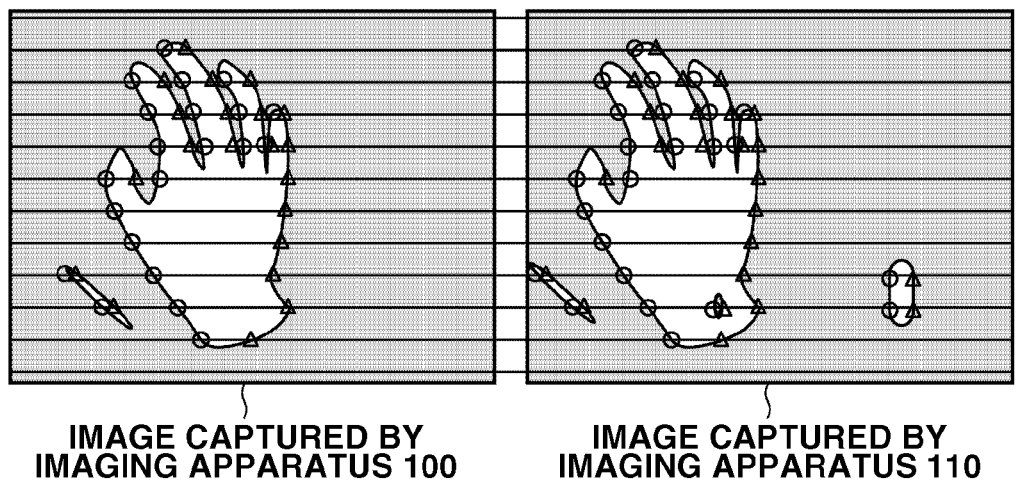
FIG. 9 illustrates the intersections superimposed and displayed on the extracted regions according to the first exemplary embodiment.

In step S3013, the attribute determination unit 3010 generates from the intersection information and the contour information a list of the attributes in the vicinities of the intersections on the scanning lines. FIG. 9 illustrates the attributes in the vicinities of the intersections displayed on the extracted regions. Referring to FIG. 9, a circle indicates a positive value and a triangle indicates a negative value.

In step S3014, the first degree of coincidence calculation unit 3020 calculates the degree of coincidence P of the attribute lists for the respective images captured by the imaging apparatuses 100 and 110. More specifically, the first degree of coincidence calculation unit 3020 sequentially scans the attributes in the attribute lists from left to right, and sets a total number of the attributes as $S_{100}$ and $S_{110}$ respectively. If a total number of coincident attributes is C, the first degree of coincidence calculation unit 3020 calculates the degree of coincidence P as follows.

$P=C/S_{110}$ (when $S_{100} \leq S_{110}$)

$P=C/S_{100}$ (when $S_{110}<S_{100}$)

The method for calculating the degree of coincidence is not limited to the above, as long as the degree of coincidence is calculated based on the obtained attributes.

Figure 10:
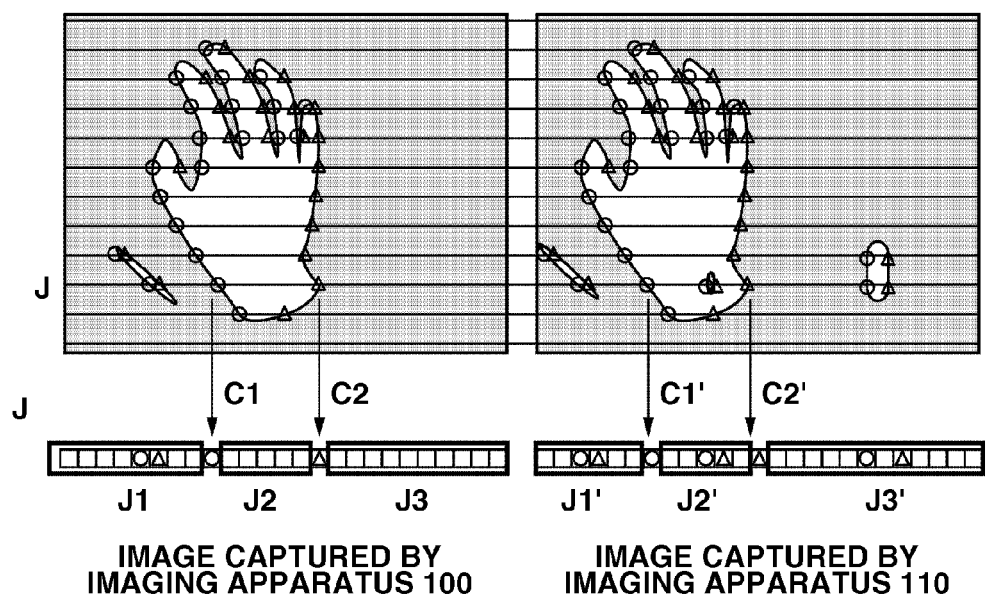
FIG. 10 is a schematic diagram illustrating a scanning line J extracted from FIG. 9 illustrating the intersections between the contours of the extracted regions and the scanning lines according to the first exemplary embodiment.

FIG. 10 is a schematic diagram illustrating a scanning line J extracted from the drawings indicating the intersections between the contours of the extracted regions and the scanning lines.

In step S3015, the first corresponding point determination unit 3030 reads the degree of coincidence P. If the degree of coincidence is greater than or equal to a threshold value T, the first corresponding point determination unit 3030 determines that the intersections are the corresponding points having the correspondence relation between the images. For example, if the attribute lists of the scanning lines other than the scanning line J (e.g., scanning lines which are a few lines above the scanning line J) are coincident with each other, the first corresponding point determination unit 3030 can determine that that intersections are corresponding points.

In step S3016, the region correlation unit 3040 performs correlation on the labels of the extracted regions of which contours pass through the intersections determined as the corresponding points, for the respective images captured by the imaging apparatuses 100 and 110.

In step S3017, the second corresponding point determination unit 3050 determines as the corresponding points, the intersections between the contours of the regions that have been correlated in step S3016 and the scanning lines, and which have not yet been determined as the corresponding points. In other words, the second corresponding point determination unit 3050 determines that the other intersections on the contours that pass through the intersections which have been determined in step S3015 to have correspondence similarly correspond, and thus determines as corresponding points. For example, points C1 and C2, and C1' and C2' illustrated in FIG. 10 are corresponding points determined to have correspondence. Since the points C1 and C2, and C1' and C2' exist on the contours of the regions that have been determined to have correspondence in step S3016 and which pass through the corresponding points obtained in step S3015, these points can be determined as the corresponding points.

In step S3018, the scanning line segmentation unit 3060 segments the intersection attribute list in which the attributes in the vicinities of the intersections on the scanning lines are listed, at the positions of the corresponding points that have been correlated in step S3017. For example, the scanning line segmentation unit 3060 segments the intersection attribute list which is the list of the attributes in the vicinity of the intersections on the scanning line J illustrated in FIG. 10, at the positions of the corresponding points C1 and C2. As a result, the scanning line J can be segmented into such as three segmented scanning lines J1, J2, and J3 in the image captured by the imaging apparatus 100, and segmented scanning lines J1', J2', and J3' in the image captured by the imaging apparatus 110.

Further, in step S3018, the scanning line segmentation unit 3060 calculates the degree of coincidence of each segmented intersection attribute list that has been segmented in step S3017 for each segmented scanning line. For example, the scanning line segmentation unit 3060 calculates the degree of coincidence between the segmented scanning lines J1 and J1', between the segmented scanning lines J2 and J2', and between the segmented scanning lines J3 and J3' illustrated in FIG. 10, by performing processing similar to that performed by the first degree of coincidence calculation unit 3020.

Figure 11:
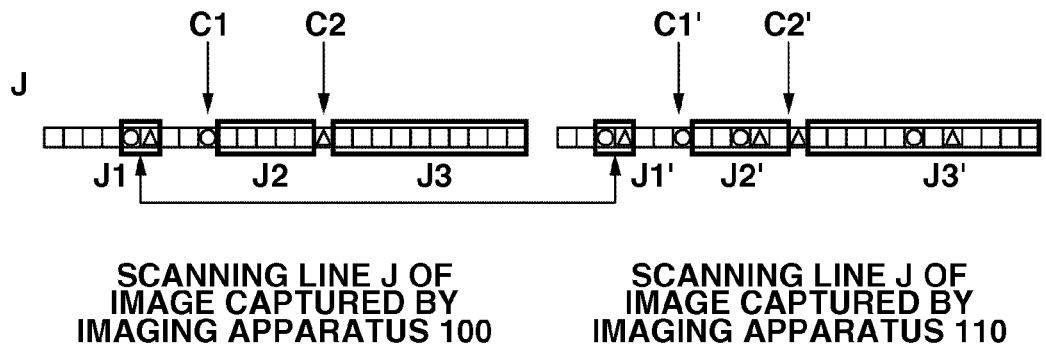
FIG. 11 is a schematic diagram illustrating a method for obtaining corresponding points on the scanning lines according to the first exemplary embodiment.

In step S3019, the third corresponding point determination unit 3080 determines as new corresponding points, the intersections that have not yet been determined as the corresponding points, based on the degree of coincidence calculated in step S3018. FIG. 11 is a schematic diagram illustrating the method for obtaining the corresponding points on the scanning lines. Referring to FIG. 11, since the portions J1 and J1' have the same pattern of the attributes of the intersections, the intersections are determined as the corresponding points.

In step S3020, the third corresponding point determination unit 3080 sets pairs of the image coordinates of the corresponding point Cn (n=1, 2, . . . , N) in the image captured by the imaging apparatus 100 and the corresponding points C'n (n=1, 2, . . . , N) in the image captured by the imaging apparatus 110 as the corresponding point information. The third corresponding point determination unit 3080 then outputs the corresponding point information to the storing unit 5000. "N" denotes the total number of pairs of corresponding points.

<Three-Dimensional Position and Orientation Calculation Flow>

Figure 12:
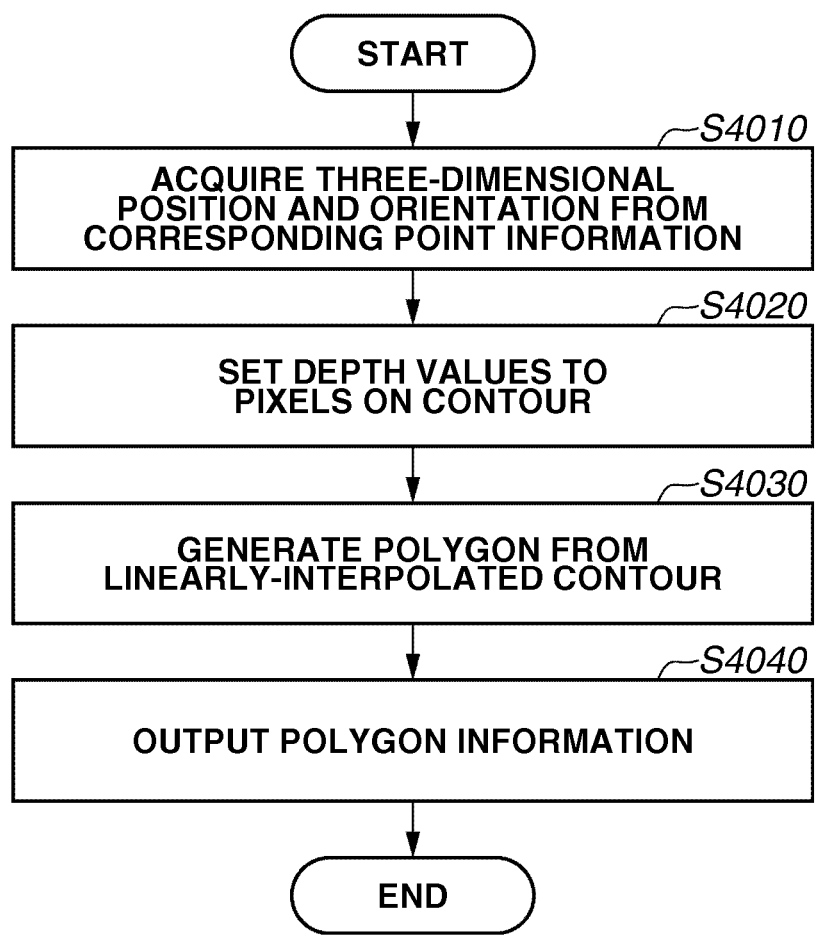
FIG. 12 is a flowchart illustrating processing performed by an object position and orientation calculation unit according to the first exemplary embodiment.

The processing performed by the object position and orientation calculation unit 4000 will be described in detail below. FIG. 12 is a flowchart illustrating the processing for calculating the three-dimensional position and orientation of the target object.

In step S4010, the intersection depth calculation unit 4010 obtains the corresponding point information from the storing unit 5000 and measures the three-dimensional position and orientation. According to the present exemplary embodiment, the three-dimensional position and orientation is calculated using the epipolar lines.

The epipolar line can be obtained by an epipolar equation.

The epipolar equation will be described below. The position of each imaging apparatus is represented by a three by one (3*1) vector T=(Tx, Ty, Tz), and the rotation is represented by a three by three (3*3) matrix R. A matrix E is defined as in equation (1).

$$E = [T]_x R \tag{1}$$

In equation (1), $[T]_x$ is represented by the following equation (2).

$$[T]_x = \begin{bmatrix} 0 & -T_z & T_y \\ T_z & 0 & T_x \\ -T_y & T_x & 0 \end{bmatrix} \tag{2}$$

When corresponding points on the respective images captured by the two imaging apparatuses are respectively represented by $x=[x, y, 1]^T$ and $x'=[x', y', 1]^T$ in a homogeneous coordinate system, the epipolar equation can be represented by the following equation (3).

$$x^T E x = 0 \tag{3}$$

The equation represents a relation between the corresponding points x and x' in the two images, and the epipolar line can thus be obtained.

As described above, the epipolar line can be obtained from a relative position and orientation between the two imaging apparatuses. The relative position and orientation between the two imaging apparatuses can be obtained by a camera calibration technique. Detailed descriptions on the camera calibration will be omitted.

A three-dimensional position and orientation calculation method using two imaging apparatuses of which directions of the optical axis are not aligned in parallel and heights of the viewpoints are not the same will be described below.

It is assumed that the internal parameters such as a focal distance and a principle point position are known, and the external parameters for the relative position and orientation between the imaging apparatuses are known. A matrix P which combines the internal parameters and the external parameters of the imaging apparatus can be represented by the following equation (4).

$$P = \begin{bmatrix} p11 & p12 & p13 & p14 \\ p21 & p22 & p23 & p24 \\ p31 & p32 & p33 & p34 \end{bmatrix} \quad (4)$$

The coordinate of a corresponding point detected from the image captured by the imaging apparatus 100 is Cn=[un, vn]. When the position of a target point in the three-dimensional space to be calculated is represented by X=[Xn, Yn, Zn], the position can be represented by the following equation (5).

$$\lambda \begin{bmatrix} u_n \\ v_n \\ 1 \end{bmatrix} = \begin{bmatrix} p11 & p12 & p13 & p14 \\ p21 & p22 & p23 & p24 \\ p31 & p32 & p33 & p34 \end{bmatrix} \begin{bmatrix} X_n \\ Y_n \\ Z_n \\ 1 \end{bmatrix} \quad (5)$$

λ is a real number determined from the third row in equation (5). When equation (3) is expanded and arranged in terms of X, Y, Z, it can be represented by equation (6).

$$\begin{bmatrix} p31u_n - p11 & p32u_n - p12 & p33u_n - p13 \\ p31v_n - p21 & p32v_n - p22 & p33v_n - p23 \end{bmatrix} \begin{bmatrix} X_n \\ Y_n \\ Z_n \end{bmatrix} = \begin{bmatrix} p14 - p34u_n \\ p24 - p34v_n \end{bmatrix} \quad (6)$$

According to the present exemplary embodiment, since the internal and external parameters of the imaging apparatus are known, the parameters P are known. Two constraint equations are thus obtained from an image captured by one imaging apparatus. When the parameters of the imaging apparatus 110 are P', and the coordinate of the corresponding point detected from the captured image is C'n=[un', vn'], four constraint equations (7) are obtained as follows.

$$\begin{bmatrix} p31u_n - p11 & p32u_n - p12 & p33u_n - p13 \\ p31v_n - p21 & p32v_n - p22 & p33v_n - p23 \\ p'31u'_n - p'11 & p'32u'_n - p'12 & p'33u'_n - p'13 \\ p'31v'_n - p'21 & p'32u'_n - p'12 & p'33u'_n - p'13 \end{bmatrix} \begin{bmatrix} X_n \\ Y_n \\ Z_n \end{bmatrix} = \begin{bmatrix} p14 - p34u_n \\ p24 - p34v_n \\ p'14 - p'34u'_n \\ p'24 - p'34v'_n \end{bmatrix} \quad (7)$$

Equation (7) gives four constraint equations for three unknown quantities. When Equation (5) is expressed as equation (8), i.e., $$M_n X_n = b_n \quad (8)$$

The least squares solution of X is given by the following equation (9).

$$X_n = (M_n^T M_n)^{-1} M_n^T b_n \quad (9)$$

The object position and orientation calculation unit 4000 calculates the least square solution for all of the corresponding points to measure three-dimensional coordinates of the corresponding points existing on the contour of the object region. The intersection depth calculation unit 4010 thus outputs to the contour depth interpolation unit 4020 the Z coordinate (i.e., a depth value) of the three-dimensional coordinates of the object region obtained with reference to the imaging apparatus 100.

In step S4020, the contour depth interpolation unit 4020 performs linear interpolation of the depth value obtained in step S4010 along with the contour, based on the image coordinates of the contour information and the corresponding information stored in the storing unit 5000.

In step S4030, the three-dimensional position and orientation generation unit 4030 generates a polygon of the virtual object from the linearly-interpolated contours.

In step S4040, the three-dimensional position and orientation generation unit 4030 renders and superimposes the generated polygon as the virtual image on the respective images captured by the imaging apparatuses 100 and 110. Then, the superimposed images are output to a display apparatus (not illustrated).

<Application to the MR Technology>

The information processing apparatus according to the present exemplary embodiment may be applied to a head mount display or a handheld display including an imaging apparatus based on the MR technology. As a result, three-dimensional position and orientation information of a real object and a virtual object can be compared, and the image or the virtual image can be drawn on the anterior side.

The head mount display refers to a display apparatus to be mounted on the head, and a handheld display refers to a portable display apparatus. Such display apparatuses are generally used for constructing a mixed reality system. If the imaging apparatus is to be attached to the head mount display or the handheld display, it is desirable to conform the optical axis of the display to the optical axis of the imaging apparatus.

As described above, when the MR technology is combined with a display apparatus such as the head mount display to measure a depth of an object region such as a human hand, the anteroposterior relation between real and virtual objects can be correctly expressed. A user can thus correctly perceive the real and virtual objects.

In addition, interference of a real object with a 3D model can be determined by obtaining three-dimensional position and orientation information of a real object such as a human hand. In other words, at the time of designing a product, the interference of a real object, such as a tool, with a 3D computer-aided design (CAD) model can be determined before producing a prototype, so that test production cost may be reduced. Further, an operator can directly touch and operate the 3D model with the hand, without using an input device such as a cyber glove.

As described above, the information processing apparatus according to the present exemplary embodiment can improve geometric consistency in the MR technology and measure three-dimensional position and orientation of a real object with comparative stability, even when an object region detected from an image contains noise. Further, the information processing apparatus is designed to use intermediate information of region extraction processing for realizing stability as basic information of a three-dimensional polygon for determining interference. As a result, the information processing apparatus can perform processing at higher speed, and reduces delay.

Furthermore, the information processing apparatus according to the present exemplary embodiment is capable of comparing measured three-dimensional information of a real object with three-dimensional information of a virtual object, and draw an image or a virtual object in the anterior side. In other words, the anteroposterior relation of the real object and the virtual object can be correctly expressed, so that the information processing apparatus can improve the geometric consistency in the MR technology and thus provide a user an MR experience with less feeling of strangeness.

According to the first exemplary embodiment, the three-dimensional position and orientation is measured using two imaging apparatuses. However, according to a second exemplary embodiment, imaging apparatuses to be used are not limited to two. Three or more imaging apparatuses may be used together.

For example, if the three-dimensional position and orientation is to be calculated using three imaging apparatuses, an imaging apparatus 120 is added to the configuration according to the first exemplary embodiment. Images captured by the imaging apparatus 120 are stored in the storing unit 5000 in the reference point detection unit 2000.

The processing according to the second exemplary embodiment is performed by additionally processing the images captured by the imaging apparatus 120 in each of the processing performed according to the first exemplary embodiment. For example, in the processing performed by the corresponding point detection unit 3000, the relation information between the imaging apparatuses 100 and 110 is input and processed first. The relation information between the imaging apparatus 100 and the imaging apparatus 120 is then input, so that two pairs of corresponding points are generated. Further, regarding the processing for calculating the three-dimensional position and orientation in step S4010, the three-dimensional position and orientation can be obtained by averaging:
  the three-dimensional position and orientation obtained from the corresponding point information of the imaging apparatuses 100 and 110; and
  the three-dimensional position and orientation obtained from the corresponding point information of the imaging apparatuses 100 and 120.

If there are four or more imaging apparatuses, the three-dimensional position and orientation can be calculated by similarly combining and processing the calculation results of the imaging apparatus pairs.

According to the first exemplary embodiment, the three-dimensional position and orientation is obtained by only extracting the color information of the human hand, i.e., the real object 150. According to a third exemplary embodiment, it is not limited to using only the color information of one real object, and the three-dimensional position and orientation may be obtained by detecting a plurality of real objects of different colors.

More specifically, when the three-dimensional position and orientation of a plurality of real objects of different colors are detected, the reference point detection unit 2000 may extract the colors of one real object, and the corresponding point detection unit 3000 and the object position and orientation calculation unit 4000 obtain the three-dimensional position and orientation. The reference point detection unit 2000 then extracts the colors of the subsequent real object, and the processes are sequentially performed.

Figure 15:
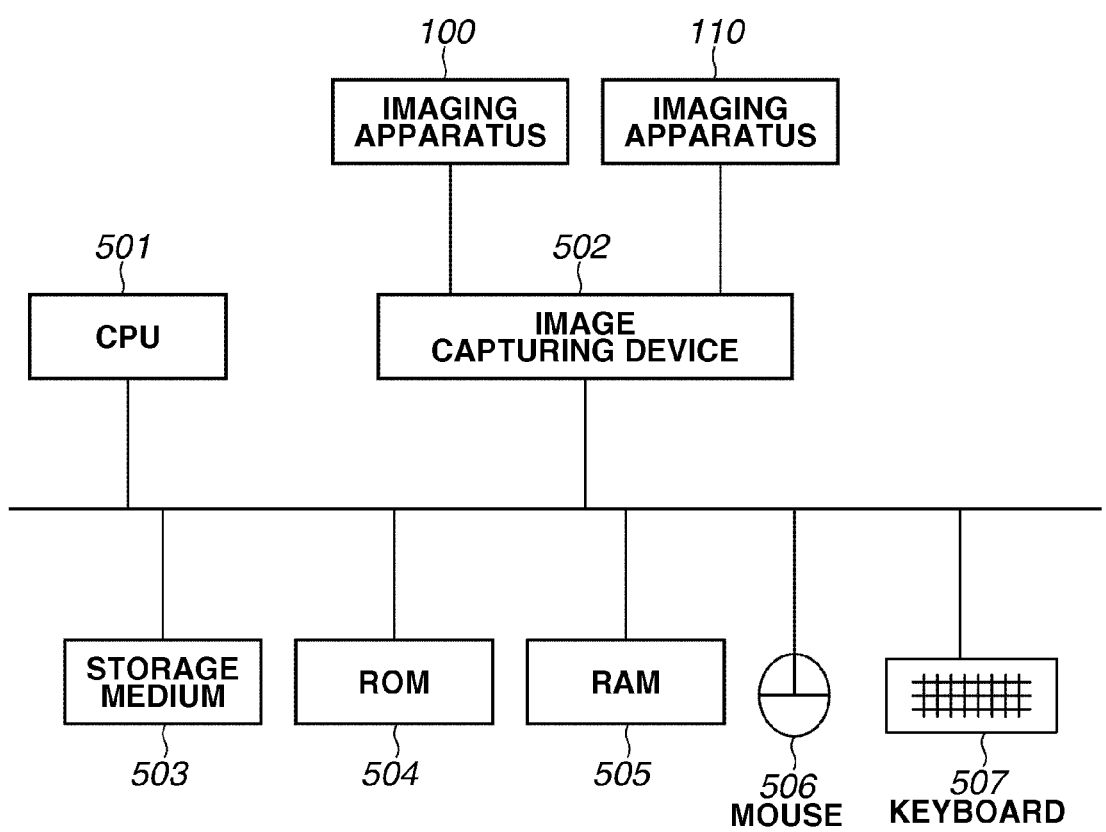
FIG. 15 is a block diagram illustrating a hardware configuration of a three-dimensional position and orientation measuring apparatus according to another exemplary embodiment.

FIG. 15 is a block diagram illustrating an example of a hardware configuration of an information processing apparatus 200 serving as a position and orientation measuring apparatus of an imaging apparatus according to another exemplary embodiment. Referring to FIG. 15, the hardware configuration thereof is similar to the configuration of a normal PC. Further, an image capturing device 502 and a storage medium 503 are connected thereto. The image capturing device 502 inputs images captured by the imaging apparatuses 100 and 110 into the computer, and corresponds to the image input unit 1000. An example of the image capturing device 502 is a video capture board. The image capturing device 502 may be any device that inputs an image captured by the camera to the computer.

A central processing unit (CPU) 501 executes programs stored in the storage medium 503, a read-only memory (ROM) 504, a RAM 505, or an external storage device (not illustrated). Accordingly, the CPU 501 functions as the reference point detection unit 2000, the corresponding point calculation unit 3000, and the object position and orientation calculation unit 4000. Further, each of the processing units stores the information in or reads the information from the storage medium 503. In such a case, a program code itself read from the storage medium realizes the functions of the above-described exemplary embodiments, and the storage medium storing the program code constitutes the exemplary embodiments.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-286326 filed Dec. 27, 2011, which is hereby incorporated by reference herein in its entirety.

What is claimed is:

1. An information processing apparatus comprising:
  an input unit configured to input a plurality of images captured from a plurality of viewpoints;
  an extraction unit configured to extract a region of an object from each of the plurality of images based on color information;
  an acquisition unit configured to obtain a contour from each region extracted by the extraction unit;
  a smoothing unit configured to obtain a plurality of smoothed contours by performing smoothing of each of the contours;
  a correlation unit configured to correlate points on the plurality of smoothed contours between the images; and
  a deriving unit configured to derive a three-dimensional coordinate of the points correlated by the correlation unit between the images,
  wherein the smoothing unit includes an endpoint setting unit configured to set a first point and a second point on the contour and a setting unit configured to set a third point between the first point and the second point on the contour,
  wherein the smoothing unit is configured to repeat an operation of the endpoint setting unit and an operation of the setting unit so that the third point is recursively set as the first point or the second point until a distance between the first point or the second point and the third point is smaller than a predetermined value and that the recursively set point between the first point and the second point is newly set as the third point, and wherein the smoothing unit is configured to obtain, as the smoothed contours, a group of lines connecting adjacent points on the contours among the points set by the endpoint setting unit and the setting unit.

2. The information processing apparatus according to claim 1, wherein the setting unit is configured to set the third point at a midpoint between the first point and the second point on the contours.

3. The information processing apparatus according to claim 1, wherein the smoothing unit smoothes the contour by connecting points in the point group on the contour by line segments.

4. The information processing apparatus according to claim 1, wherein the correlation unit sets scanning lines that pass through same positions among the plurality of images, and detects corresponding points between the plurality of images based on intersections between the scanning lines and the smoothed contours.

5. A method for performing information processing comprising:
    inputting a plurality of images captured from a plurality of viewpoints;
    extracting a region of an object from each of the plurality of images based on color information;
    obtaining a contour from each extracted region;
    obtaining a plurality of smoothed contours by performing smoothing of each of the contours;
    correlating points on the plurality of smoothed contours between the images; and
    deriving a three-dimensional coordinate of the points correlated by the correlation unit between the images,
    wherein the obtaining a plurality of smoothed contours sets a first point and a second point on the contour, and sets a third point between the first point and the second point on the contour,
    wherein the obtaining a plurality of smoothed contours repeats an operation of the setting the first point and the second point, and an operation of setting the third point so that the third point is recursively set as the first point or the second point until a distance between the first point or the second point and the third point is smaller than a predetermined value and that the recursively set point between the first point and the second point is newly set as the third point, and
    wherein the obtaining a plurality of smoothed contours obtains, as the smoothed contours, a group of lines connecting adjacent points on the contours among the points set by the operation of the setting the first point and the second point, and the operation of setting the third point.

6. A non-transitory computer-readable storage medium storing a program for causing a computer to perform each processing in a method for performing information processing comprising:
    inputting a plurality of images captured from a plurality of viewpoints;
    extracting a region of an object from each of the plurality of images based on color information;
    obtaining a contour from each extracted region;
    obtaining a plurality of smoothed contours by performing smoothing of each of the contours;
    correlating points on the plurality of smoothed contours between the images; and
    deriving a three-dimensional coordinate of the points correlated by the correlation unit between the images,
    wherein the obtaining a plurality of smoothed contours sets a first point and a second point on the contour, and sets a third point between the first point and the second point on the contour,
    wherein the obtaining a plurality of smoothed contours repeats an operation of the setting the first point and the second point, and an operation of setting the third point so that the third point is recursively set as the first point or the second point until a distance between the first point or the second point and the third point is smaller than a predetermined value and that the recursively set point between the first point and the second point is newly set as the third point, and
    wherein the obtaining a plurality of smoothed contours obtains, as the smoothed contours, a group of lines connecting adjacent points on the contours among the points set by the operation of the setting the first point and the second point, and the operation of setting the third point.

7. The information processing apparatus according to claim 1, further comprising:
    an intersection detection unit configured to detect intersections between a plurality of scanning lines corresponding to one another among the plurality of images and the smoothed contours;
    an attribute determination unit configured to determine an attribute of each of the intersections detected by the intersection detection unit, the attribute indicating on which side of a scanning direction of each of the plurality of scanning lines a region having, as a contour, a smoothed contour passing through each of the intersections along each of the plurality of scanning lines is located,
    wherein the correlation unit is configured to correlate points having a correspondence relation between the images among the intersections based on the attribute of each of the intersections determined by the attribute determination unit.

8. The information processing apparatus according to claim 7,
    wherein the correlation unit includes:
    a first degree-of-coincidence calculation unit configured to calculate a first degree of coincidence of the scanning lines by comparing the attribute of the intersection in each of the scanning lines corresponding to one another,
    a first corresponding point determination unit configured to determine corresponding points having a correspondence relation between the images among the detected intersections on the scanning lines based on the first degree of coincidence, and
    a second corresponding point determination unit configured to determine, as corresponding points, other intersections on the smoothed contours passing through the intersections determined as the corresponding points among the intersections that are not determined as the corresponding points by the first corresponding point determination unit.

9. The information processing apparatus according to claim 8, wherein the correlation unit further includes:
    a scanning line segmentation unit configured to generate a plurality of segmented scanning lines by segmenting each of the scanning lines at positions of the corresponding points determined as corresponding points by the first corresponding point determination unit or the second corresponding point determination unit;
    a second degree-of-coincidence calculation unit configured to calculate a second degree of coincidence of the segmented scanning lines between the images by comparing the attributes of the intersections between the images for each of the segmented scanning lines; and a third corresponding point determination unit configured to determine corresponding points having a correspondence relation between the images among the intersections based on the second degree of coincidence.

10. The information processing apparatus according to claim 7, wherein the scanning lines are epipolar lines.

11. The information processing apparatus according to claim 1, further comprising a generation unit configured to generate a virtual object representing the object based on the three-dimensional coordinate of the points derived by the deriving unit.

12. The information processing apparatus according to claim 1, further comprising a combining unit configured to combine an image including the object with the virtual object based on the three-dimensional coordinate of the points derived by the deriving unit.

13. The information processing apparatus according to claim 1, wherein the image is an image captured by an imaging apparatus attached to a head-mounted display or a hand-held display.

* * * * *